(12) United States Patent
Lee et al.

(10) Patent No.: US 11,428,978 B2
(45) Date of Patent: Aug. 30, 2022

(54) DISPLAY DEVICE

(71) Applicant: Samsung Display Co., LTD., Yongin-si (KR)

(72) Inventors: Dong Hee Lee, Hwaseong-si (KR); Baek Hee Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 116 days.

(21) Appl. No.: 16/940,374

(22) Filed: Jul. 27, 2020

(65) Prior Publication Data

US 2021/0223613 A1  Jul. 22, 2021

(30) Foreign Application Priority Data

Jan. 22, 2020  (KR) .................. 10-2020-0008413

(51) Int. Cl.
 *G02F 1/1343* (2006.01)
 *G02F 1/1335* (2006.01)
 *G02F 1/1333* (2006.01)

(52) U.S. Cl.
 CPC .... *G02F 1/133512* (2013.01); *G02F 1/13439* (2013.01); *G02F 1/133345* (2013.01); *G02F 1/134309* (2013.01); *G02F 2201/121* (2013.01); *G02F 2201/123* (2013.01)

(58) Field of Classification Search
 CPC ............. G02F 1/1333; G02F 1/133302; G02F 1/133305; G02F 1/133345; G02F 1/1343; G02F 1/134309; G02F 1/134318; G02F 1/13439; G02F 1/133502; G02F 1/133512; G02F 1/136209; G02F 2201/121; G02F 2201/123
 See application file for complete search history.

(56) References Cited

U.S. PATENT DOCUMENTS

| | | | |
|---|---|---|---|
| 5,667,853 | A | 9/1997 | Fukuyoshi et al. |
| 8,642,377 | B2 | 2/2014 | Lin et al. |
| 9,891,484 | B2 | 2/2018 | Shin et al. |

(Continued)

FOREIGN PATENT DOCUMENTS

| | | |
|---|---|---|
| EP | 0733931 | 8/2003 |
| JP | 1995-114841 | 5/1995 |

(Continued)

*Primary Examiner* — Thoi V Duong
(74) *Attorney, Agent, or Firm* — H.C. Park & Associates, PLC

(57) ABSTRACT

Provided is a display device including a first substrate including a pixel electrode provided for each pixel; and a second substrate facing the first substrate and including an insulating substrate, a light blocking member disposed along a boundary the pixel, and a common electrode disposed along the plurality of pixels; wherein the common electrode includes a first common electrode layer and a second common electrode layer, the first common electrode layer and the second common electrode layer including a transparent conductive material, wherein the first common electrode layer is disposed on one surface of the insulating substrate, wherein the light blocking member is disposed on the first common electrode layer, and wherein the second common electrode layer is disposed on the first common electrode layer and the light blocking member.

18 Claims, 16 Drawing Sheets

(56) References Cited

U.S. PATENT DOCUMENTS

2005/0052594 A1* 3/2005 Lee .................. G02F 1/133382
                                              349/110
2017/0090254 A1* 3/2017 Tateno .............. G02F 1/134309
2019/0155095 A1* 5/2019 Chen ................ G02F 1/133516

FOREIGN PATENT DOCUMENTS

| KR | 10-0581856 | 5/2006 |
| KR | 2010-0066220 | 6/2010 |
| KR | 10-1246005 | 3/2013 |

* cited by examiner

DISPLAY DEVICE

CROSS REFERENCE TO RELATED APPLICATION

This application claims priority from and the benefit of Korean Patent Application No. 10-2020-0008413, filed on Jan. 22, 2020, which is hereby incorporated by reference for all purposes as if fully set forth herein.

BACKGROUND

Field

Exemplary embodiments of the invention relate generally to a display device.

Discussion of the Background

The importance of a display device has increased with the development of multimedia. Accordingly, various types of display devices such as a liquid crystal display (LCD) and an organic light emitting display (OLED) have been used.

In such a display device, reflection caused by the surface of a material provided on the front of a screen or reflection of external light caused by an inner electrode, a light blocking member, or a thin film transistor (TFT) occurs, and thus contrast ratio may be reduced outdoors or in a bright room.

The above information disclosed in this Background section is only for understanding of the background of the inventive concepts, and, therefore, it may contain information that does not constitute prior art.

SUMMARY

Exemplary embodiments of the present invention provide a display device capable of reducing external light reflection.

Additional features of the inventive concepts will be set forth in the description which follows, and in part will be apparent from the description, or may be learned by practice of the inventive concepts.

Exemplary embodiments provide a display device including a first substrate including a pixel electrode provided for each pixel; and a second substrate facing the first substrate and including an insulating substrate, a light blocking member disposed along a boundary the pixel, and a common electrode disposed along the plurality of pixels. The common electrode includes a first common electrode layer and a second common electrode layer, the first common electrode layer and the second common electrode layer including a transparent conductive material. The first common electrode layer is disposed on one surface of the insulating substrate, the light blocking member is disposed on the first common electrode layer, and the second common electrode layer is disposed on the first common electrode layer and the light blocking member.

Another exemplary embodiment provides a display device includes a first substrate including a pixel electrode provided for each pixel; and a second substrate facing the first substrate and including an insulating substrate, a light blocking member disposed along a boundary the pixel, a transparent insulating layer disposed along the plurality of pixels, and a common electrode disposed along the plurality of pixels and including a transparent conductive material. The transparent insulating layer is disposed on one surface of the insulating substrate, the light blocking member is disposed on the transparent insulating layer, and the common electrode is disposed on the transparent insulating layer and the light blocking member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
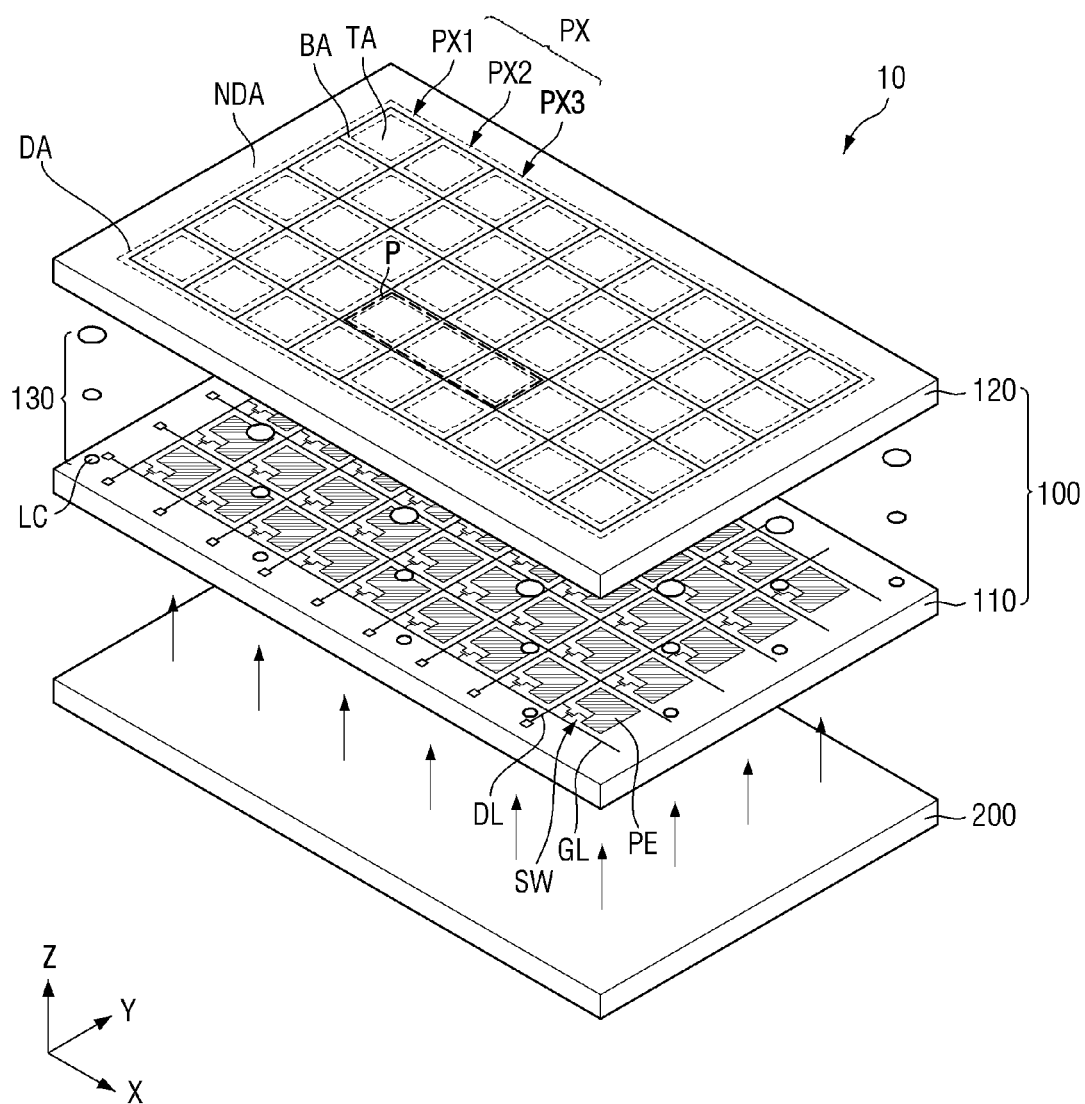
FIG. 1 is an exploded perspective view illustrating a display device according to an embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, specific embodiments will be described with reference to the attached drawings.

FIG. 1 is an exploded perspective view illustrating a display device according to an embodiment.

In embodiments, the first direction X, the second direction Y, and the third direction Z cross each other in different perpendicular directions. In the perspective view of FIG. 1, for convenience of description, the horizontal direction of the display device 10 is defined as the first direction X, the vertical direction is defined as the second direction Y, and the thickness direction is defined as the third direction Z. However, it should be understood that the directions mentioned in the embodiments refer to relative directions, and the embodiments are not limited to the mentioned directions.

Referring to FIG. 1, a display device 10 according to an embodiment may be applied to various home appliances such as smart phones, mobile phones, tablet personal computers (tablet PCs), person digital assistances (PDAs), portable multimedia players (PMPs), televisions, game machines, wrist watch-type electronics, head mount displays, personal computer monitors, notebook computers, car navigators, car dashboards, digital cameras, camcorders, external billboards, electronic boards, medical devices, inspection devices, refrigerators and washing machines, or may be applied to internet of things (IoTs).

Examples of the display device 10 may include a liquid crystal display, an electrophoretic display, an organic light emitting display, a plasma display, a field emission display, an electrowetting display, a quantum dot light emitting display, and a micro LED display. Hereinafter, although a liquid crystal display device is described as an example of the display device 10, the applicable embodiments are not limited thereto.

The display device 10 includes a display panel 100. When the display device 10 is a light receiving device such as a liquid crystal display device, the display device 10 may further include a light source unit 200.

The light source unit 200 is disposed under the display panel 100 and emits light toward the display panel 100. The light source unit 200 may further include a light source, and a plate or a film that controls a path of light, polarization, or the like. The light source may include a light emitting diode (LED). The light source unit 200 may be a direct type light source unit in which a light source is disposed under a lower portion of the display panel 100 to overlap the lower portion thereof or the light source unit 200 may be an edge type light source unit in which a light source is disposed near an edge of the display panel 100 in a plan view. Other various types or kinds of light source units may be applied to the light source unit 200 of the embodiment.

Light provided by the light source unit 200 may sequentially pass through the first substrate 110, the liquid crystal layer 130, and the second substrate 120 to contribute to the image display of the display device 10.

The display panel 100 may include a display area DA and a non-display area NDA. The display area DA is an area in which an image is displayed, and the non-display area NDA is an area which is not related to the image display. The display area DA may have a rectangular shape in a plan view as illustrated in FIG. 1, but is not limited thereto, and may be modified into various shapes such as a square, a circle, and an ellipse. The non-display area NDA may be disposed around the display area DA. In an embodiment in which the display area DA has a rectangular shape, the non-display area NDA may be disposed outside of the display area DA.

The display area DA includes a plurality of pixels PX. Each pixel PX may display one of the primary colors in order to implement color display. For example, the plurality of pixels PX may include a red pixel PX1 displaying a red color, a green pixel PX2 displaying a green color, and a blue pixel PX3 displaying a blue color. Red pixels PX1, green pixels PX2, and blue pixels PX3 may be alternately arranged along the first direction X and/or the second direction Y. For example, red pixels, green pixels, and blue pixels may be repeatedly arranged along one side of the first direction X, and a plurality of pixels displaying the same color may be repeatedly arranged along the second direction Y.

The display panel 100 may be divided into a light transmitting area TA and a light blocking area BA according to whether the light provided from the light source unit 200 is transmitted.

The light transmitting area TA may be an area through which the light provided from the light source unit 200 is transmitted. The light transmitting area TA may be formed by stacking light transmitting material layers along the thickness direction, thereby transmitting the light incident from the lower side upward. At least a part of each pixel PX, for example, a central portion of each pixel PX may be included in the light transmitting area TA.

The light blocking area BA may be an area blocking the transmission of light incident from the light source unit 200. In the light blocking area BA, at least one light blocking material layer is disposed along the thickness direction Z, thereby preventing the light incident from the lower side from being transmitted upward. Examples of the light blocking material layer include various display driving lines, pixel driving lines, a black matrix, and an outermost black matrix.

For example, the non-display area NDA in which various display driving lines and the outermost black matrix are disposed may include the light blocking BA. The planar shape of the light blocking area BA of the non-display area NDA may be substantially the same as the planar shape of the non-display area NDA itself.

Further, in the display area DA, a boundary portion of the pixel PX at which the pixel driving lines and the black matrix are disposed may be included in the light blocking area BA. The planar shape of the light blocking area BA in the display area DA may be a grid shape connected along the boundary of the pixel PX.

The display panel 100 may include a first substrate 110, a second substrate 120 facing the first substrate 110, and a liquid crystal layer 130 interposed between the first substrate 110 and the second substrate 120. Hereinafter, the display panel 100 will be described in detail with reference to FIGS. 1 and 2.

Figure 2:
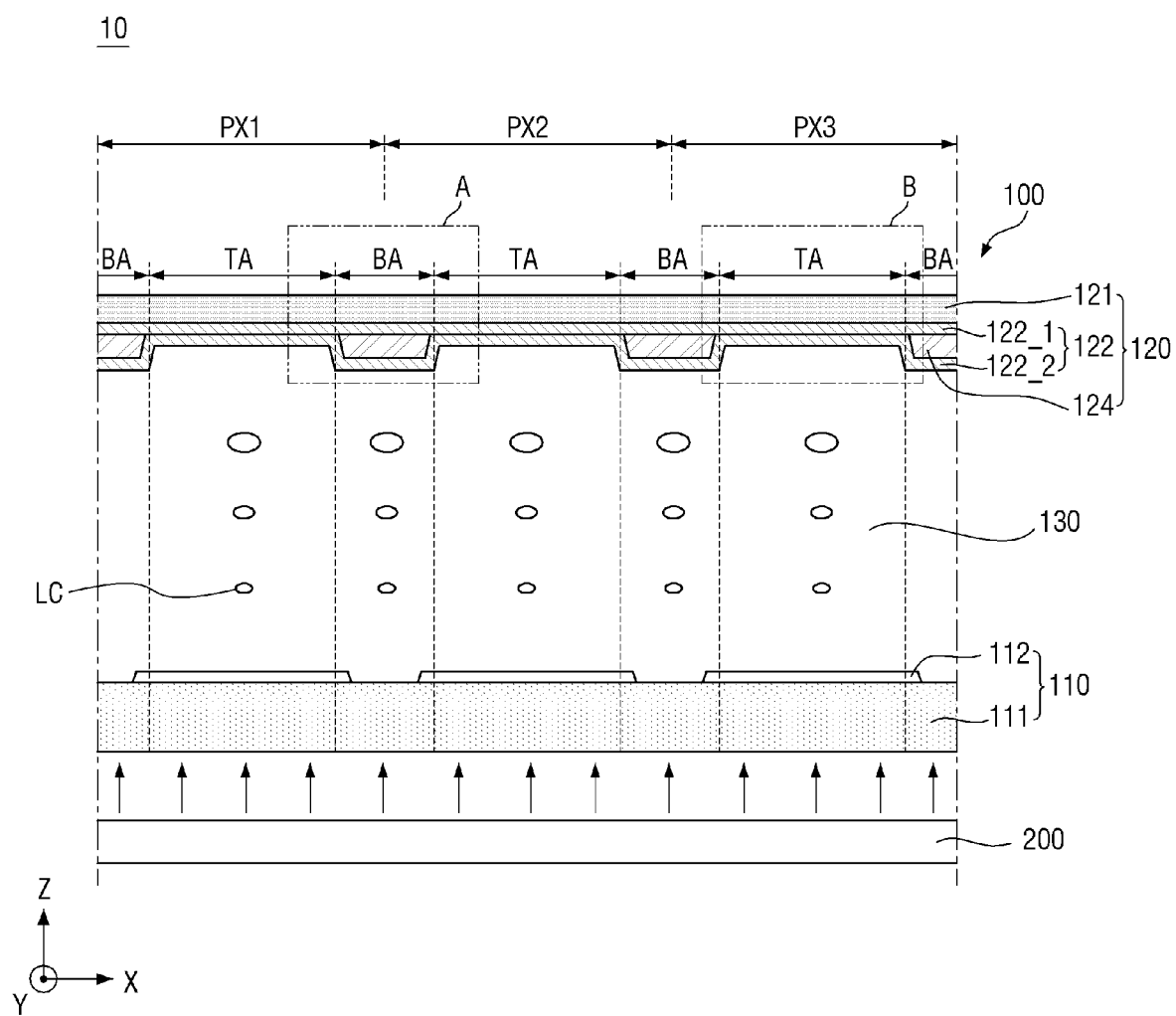
FIG. 2 is a cross-sectional view of the portion 'P' of the display device of FIG. 1.

FIG. 2 is a cross-sectional view of the portion 'P' of the display device of FIG. 1. In FIG. 2, for convenience of description, illustrations of a gate line GL, a data line DL, a switching element SW, and the like disposed between a first insulating substrate 111 and a pixel electrode PE are omitted.

Referring to FIGS. 1 and 2, the first substrate 110 may include a first insulating substrate 111, a gate line GL, a data line DL, a switching element SW, and a pixel electrode PE.

The first insulating substrate 111 may include a transparent material such as glass or transparent plastic.

The switching element SW may be disposed on one surface of the first insulating substrate 111. The switching element SW serves to control a voltage applied to each pixel electrode PE. The switching element SW may be, for example, a thin film transistor. A switching element SW may be included for each pixel PX (PX1 to PX3).

The first substrate 110 may further include a gate line GL and a data line DL disposed on one surface of the first insulating substrate 111. The gate line GL may extend in the first direction X along the boundary of the pixel PX, and the data line DL may extend in the second direction Y along the boundary of the pixel PX. The gate line GL and the data line DL may be connected to the switching element SW to transfer a gate driving signal and a data driving signal to the pixel electrode PE to be described later.

An area in which the gate line GL and the data line DL are disposed may correspond to the light blocking area BA of the display panel 100. The gate line GL and the data line DL do not transmit light by themselves and are disposed to overlap in a Z direction a light blocking member 124 to define the light blocking area BA in the display area DA together with the light blocking member 124.

A pixel electrode PE may be disposed on one surface of the first insulating substrate 111 for each pixel PX. The pixel electrode PE may be disposed over the gate line GL, the data line DL, the switching element SW, and the like.

The pixel electrode PE may be an electric field generating electrode that forms an electric field in the liquid crystal layer 130 together with the common electrode 122 to be described later. The pixel electrode PE may include a transparent conductive material. For example, the pixel electrode PE may be made of indium tin oxide (ITO), indium zinc oxide (IZO), indium tin zinc oxide (ITZO), zinc oxide (ZO), or the like, but the material thereof is not limited thereto. Each pixel electrode PE may be disposed such that at least a portion (for example, a central portion) of the pixel electrode PE is located in the light transmitting area TA. In an embodiment, another portion (for example, an edge portion) of each pixel electrode PE may be located in the light blocking area BA, but the present invention is not limited thereto.

Although not illustrated, an alignment layer may be disposed on the pixel electrode PE. Further, although not illustrated in FIG. 2, the first substrate 110 may further include a color filter or a color conversion pattern disposed for each pixel PX.

The liquid crystal layer 130 is disposed on one surface of the alignment layer. The liquid crystal layer 130 includes a plurality of liquid crystals LC. The liquid crystals LC may have negative dielectric anisotropy or positive dielectric anisotropy.

The second substrate 120 is disposed on one surface of the liquid crystal layer 130. The second substrate 120 may be a facing substrate configured to seal the liquid crystal layer 130 together with the first substrate 110.

The second substrate 120 may include a second insulating substrate 121, a common electrode 122, and a light blocking member 124.

Like the first insulating substrate 110, the second insulating substrate 121 may include a transparent material such as glass or transparent plastic.

The common electrode 122 may be disposed on one surface of the second substrate 120 to form an electric field in the liquid crystal layer 130 together with the pixel electrode PE.

The common electrode 122 may include a conductive material. For example, the common electrode 122 may be made of indium tin oxide, indium zinc oxide, aluminum-doped zinc oxide (AZO), zinc oxide, or the like, but the material thereof is not limited thereto.

The common electrode 122 may include a plurality of layers that have matching refractive indices to reduce external light reflection. By including electrodes with modified refractive indices, where the refractive index is the same or similar to an adjacent material layer, an amount of light transmitted through the display structure may be increased, thus decreasing reflectivity, providing a higher optical efficiency, and lowering energy consumption by the display structure.

The common electrode 122 may include a first common electrode layer 122_1 and a second common electrode layer 122_2.

The first common electrode layer 122_1 is disposed on a surface of the second insulating substrate 121, and the second common electrode layer 122_2 is disposed on a surface of the first common electrode layer 122_1 and the light blocking member 124.

The first common electrode layer 122_1 and/or the second common electrode layer 122_2 may be provided integrally for each pixel PX. The first common electrode layer 122_1 and/or the second common electrode layer 122_2 may be disposed over the whole surface of the second insulating substrate 121 without distinguishing between the light transmitting area TA and the light blocking area BA.

Although the first common electrode layer 122_1 and the second common electrode layer 122_2 are disposed to contact each other in the light transmitting area TA, the first common electrode layer 122_1 and the second common electrode layer 122_2 may be spaced apart from each other with the light blocking member 124 therebetween in the light blocking layer BA where the light blocking member 124, which will be described later, is disposed.

Because the first common electrode layer 122_1 is disposed on one surface of second insulating substrate 121 and the one surface of second insulating substrate 121 is flat, the first common electrode layer 122_1 has a flat shape. However, because the second common electrode layer 122_2 is disposed on the first common electrode layer 122_1 on which a pattern of the light blocking member 124 is formed, the second common electrode layer 122_2 may be disposed in a conformal manner to the surface shape of the light blocking member 124. In detail, the second common electrode layer 122_2 may have different surface heights in the light transmitting area TA and the light blocking area BA. In general, the second common electrode layer 122_2 may have an uneven pattern shape having a convex portion having a lattice shape.

The first common electrode layer 122_1 may have a thickness to reduce external light reflection of the display panel 100. The thickness of the first common electrode layer 122_1 may be a thickness capable of maximizing destructive interference of external light reflected from the light blocking area BA.

The anti-reflective coatings of the common electrode 122 and the common electrode 122 in combination with the light blocking member 24 and other layers may include transparent, thin film structures with alternating layers of contrasting refractive index, which are configured to result in destructive interference in the light reflected from the interfaces, and constructive interference in the corresponding transmitted light. Destructive interference occurs when wave amplitudes oppose each other, resulting in waves of reduced amplitude.

The first common electrode layer 122_1 may have a thickness configured to reduce external light reflection in the light blocking area BA. Here, the thickness of the first common electrode layer 122_1 may have a thickness capable of effectively generating destructive interference between the external light reflected from the upper side of the first common electrode layer 122_1 and the external light reflected from the upper side of the light blocking member 124. For example, when the thickness of the first common electrode layer 122_1 is about 400 Å or less, destructive interference of external light reflected from the light blocking area may be effectively performed. In an embodiment, the thickness of the first common electrode layer 122_1 may be about 150 Å to about 400 Å. In some embodiments, the thickness of the first common electrode layer 122_1 may be about 300 Å.

The thickness of the second common electrode layer 122_2 is related to the resistance of the entire common electrode 122 and the transmittance of the light transmitting area TA. The resistance of the common electrode 122 may be decreased as the thickness of the common electrode 122 is increased. The transmittance of the common electrode 122 tends to decrease as the thickness increases. In this regard, the total thickness of the common electrode 122 may be in the range of 900 Å to 2500 Å. Therefore, the thickness of the second common electrode layer 122_2 may be determined in consideration of the total thickness of the common electrode 122 and the thickness of the first common electrode layer 122_1 in order to reduce external light reflection in the light blocking area BA. Because the first common electrode layer 122_1 is set to 400 Å or less to reduce external light reflection of the light blocking area BA, the thickness of the second common electrode layer 122_2 to satisfy resistance and transmittance may be greater than that of the first common electrode layer 122_1. For example, the thickness of the second common electrode layer 122_2 may be about 2 to 8 times the thickness of the first common electrode layer 122_1.

When the common electrode layer 122 is made of a low-resistance material having a lower resistance than indium tin oxide or the like, the above thickness relationship may be changed. For example, the thickness of the first common electrode layer 122_1 may be equal to the thickness of the second common electrode layer 122_2, or may be greater than the thickness of the second common electrode layer 122_2.

The thickness of the second common electrode layer 122_2 also affects the external light reflectance in the light transmitting area TA. In the light transmitting area TA, the first common electrode layer 122_1 and the second common electrode layer 122_2 are in contact with each other. In an embodiment, the first common electrode layer 122_1 and the second common electrode layer 122_2 may have the same or similar refractive index. In this case, optically, the first common electrode layer 122_1 and the second common electrode layer 122_2 may be recognized as one optical layer in the light transmitting area TA. The destructive interference rate of reflected light varies depending on the total thickness of the optical layer. For example, when the total thickness of the optical layer is 1100 Å to 1600 Å, effective external light reflection reduction may be achieved even in the light transmitting area TA. In this regard, the thickness of the second common electrode layer 122_2 may be about 950 Å to about 1200 Å. In an embodiment, the thickness of the second common electrode layer 122_2 may be about 1050 Å.

As described above, the first common electrode layer 122_1 and the second common electrode layer 122_2 may have substantially the same or similar refractive indices to reduce external light reflection. For example, the refractive indices of the first common electrode layer 122_1 and the second common electrode layer 122_2 may be 1.7 to 2.2, respectively. As another example, the refractive index of the first common electrode layer 122_1 may be 1.8 to 2.0, and the refractive index of the second common electrode layer 122_2 may be 1.7 to 2.1. As another example, the refractive index of the second common electrode layer 122_2 may be 95% to 105% of the refractive index of the first common electrode layer 122_1. As another example, the absolute value of a difference in refractive index between the first common electrode layer 122_1 and the second common electrode layer 122_2 may be 0.05 or less. In some other embodiments, the first common electrode layer 122_1 and the second common electrode layer 122_2 may have different refractive indices.

At least one of the first common electrode layer 122_1 or the second common electrode layer 122_2 may have a refractive index greater than a refractive index of the light blocking member 124. For example, the refractive index of the first common electrode layer 122_1 or the second common electrode layer 122_2 may be 1.8 or more and less than 2.2, and the refractive index of the light blocking member 124 may be 1.6 or more and 1.8 or less.

At least one of the first common electrode layer 122_1 or the second common electrode layer 122_2 may have a refractive index greater than a refractive index of the second insulating substrate 121. For example, the refractive index of the first common electrode layer 122_1 may be 1.8 or more and less than 2.2, and the refractive index of the second insulating substrate 121 may be 1.4 or more and less than 1.6.

The light blocking member 124 is disposed on one surface of the first common electrode layer 122_1. The light blocking member 124 is disposed in the light blocking area BA.

The second common electrode layer 122_2 is disposed on a surface of the first common electrode layer 122_1 on which the light blocking member 124 is disposed. In other words, in the light blocking area BA the light blocking member 124 is sandwiched between the first common electrode layer 122_1 and the second common electrode layer 122_2.

The light blocking members 124 may be arranged at predetermined intervals. The light blocking member 124 may be composed of a plurality of members, or may be implemented as one member or layer at least partially interconnected.

The light blocking member 124 may be disposed in a lattice shape along the boundary of the pixel PX in the display area DA. Here, the light blocking member 124 may have a plurality of openings corresponding to the light transmitting area TA between the lattice shapes. For example, the light blocking member 124 may be a black matrix.

The light blocking member 124 includes a material that blocks the transmission of external light by absorbing or reflecting light of at least a specific wavelength band. For example, the light blocking member 124 may include a light absorbing material that absorbs light in the visible light wavelength band. The light absorbing material may be dispersed in resin. The light entering the light blocking member 124 is absorbed by the light absorbing material distributed on a traveling path to block the transmission of light through the light blocking member 124.

Because the light blocking member 124 includes a resin other than the light absorbing material, the light blocking member 124 may have a predetermined refractive index by the resin. Accordingly, an optical interface is formed with another adjacent layer, and thus reflection, refraction, etc. of light may occur on the optical interface. The refractive index of the light blocking member 124 may be greater than the refractive index of the second insulating substrate 121 in contact with the light blocking member 124. For example, the refractive index of the light blocking member 124 may greater than or equal to 1.7 and less than 1.8, and the refractive index of the second insulating substrate 121 may be greater than or equal to 1.4 and less than 1.6.

The thickness of the light blocking member 124 may be greater than the thickness of the first common electrode layer 122_1, or the thickness of the second common electrode layer 122_2, or a thickness of a metal layer 122_3c to be described later. For example, the thickness of the light blocking member 124 may be two times to eight times the thickness of the first common electrode layer 122_1. As another example, the thickness of the light blocking member 124 may be greater than or equal to 1.0 μm and less than or equal to 1.2 μm.

The light blocking member 124 may be surrounded by the common electrode 122. For example, one surface of the light blocking member 124 may be surrounded by the first common electrode layer 122_1, and the other surface and the side surface of the light blocking member 124 may be surrounded by the second common electrode layer 122_2.

The light blocking member 124 may define a light blocking area BA and a light transmitting area TA. In detail, the light blocking area BA may be an area in which the light blocking member 124 is disposed, and the light transmitting area TA may be a remaining area in which the light blocking member 124 is not disposed. For example, in the light blocking area BA, the second insulating substrate 121, the first common electrode layer 122_1, the light blocking member 124, and the second common electrode layer 122_2 may be sequentially disposed, and in the light transmitting area TA, the second insulating substrate 121, the first common electrode layer 122_1, and the second common electrode layer 122_2 may be sequentially disposed.

Although not illustrated in FIG. 2, when the first substrate does not include the color filter or the color conversion pattern, the second substrate 120 may further include the color filter or the color conversion pattern between the light blocking members 124 in the light transmitting area TA.

Figure 3:
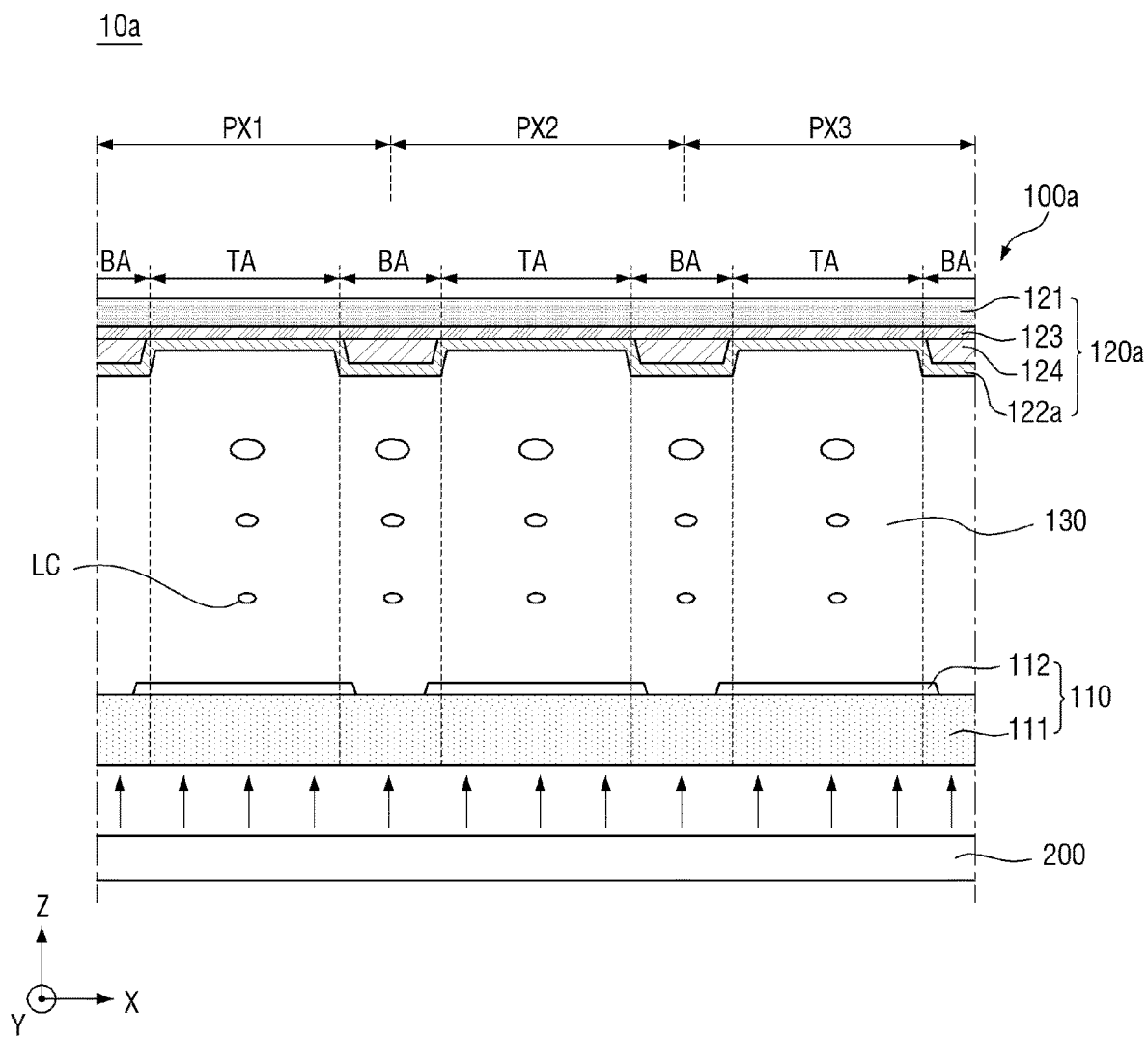
FIG. 3 is a cross-sectional view illustrating a display device according to another embodiment.

FIG. 3 is a cross-sectional view illustrating a display device according to another embodiment.

Referring to FIG. 3, a display device 10*a* according to an embodiment of FIG. 3 is different from the display device 10 according to the embodiment of FIG. 2 in that a transparent insulating layer 123 is inserted instead of the first common electrode layer 122_1. A common electrode 122*a* of FIG. 3 may replace the second common electrode layer 122_2 of FIG. 2.

An alternative second substrate 120*a* includes the second insulating substrate 121, the common electrode 122*a*, the transparent insulating layer 123, and the light blocking member 124.

The transparent insulating layer 123 may include an insulating material. For example, the transparent insulating layer 123 may include silicon nitride (SiNx).

The transparent insulating layer 123 may have a refractive index that is substantially the same as or similar to that of the common electrode 122*a*. The transparent insulating layer 123 and the common electrode 122*a* may have different refractive indices from each other. For example, the refractive indices of the transparent insulating layer 123 and the common electrode 122*a* may be 1.7 to 2.2, respectively. As another example, the refractive index of the transparent insulating layer 123 may be 1.8 to 2.0, and the refractive index of the common electrode 122*a* may be 1.7 to 2.1. As another example, the refractive index of the common electrode 122*a* may be 95% to 105% of the refractive index of the transparent insulating layer 123. As another example, the absolute value of a difference in refractive index between the transparent insulating layer 123 and the common electrode 122*a* may be within 0.05.

The transparent insulating layer 123 may have a refractive index larger than that of the light blocking member 124. For example, the refractive index of the transparent insulating layer 123 may be 1.8 or more and less than 2.2, and the refractive index of the light blocking member 124 may be 1.6 or more and 1.8 or less.

The transparent insulating layer 123 may have a refractive index larger than that of the second insulating substrate 121. For example, the refractive index of the transparent insulating layer 123 may be 1.8 or more and less than 2.2, and the refractive index of the second insulating substrate 121 may be 1.4 or more and less than 1.6.

The transparent insulating layer 123 may have a thickness configured to reduce external light reflection. For example, the thickness of the transparent insulating layer 123 may be 150 Å to 400 Å, and the thickness of the common electrode 122*a* may be 950 Å to 1200 Å. As another example, the thickness of the transparent insulating layer 123 may be about 290 Å to 310 Å, and the thickness of the common electrode 122*a* may be about 1040 Å to 1060 Å.

Because the thickness and layout of the transparent insulating layer 123 and thus the reduction of external light reflection in the light blocking area BA are substantially the same as or similar to those of the first common electrode layer 122_1 of FIGS. 2 and 5 to 7, a detailed description thereof will be omitted.

Figure 4:
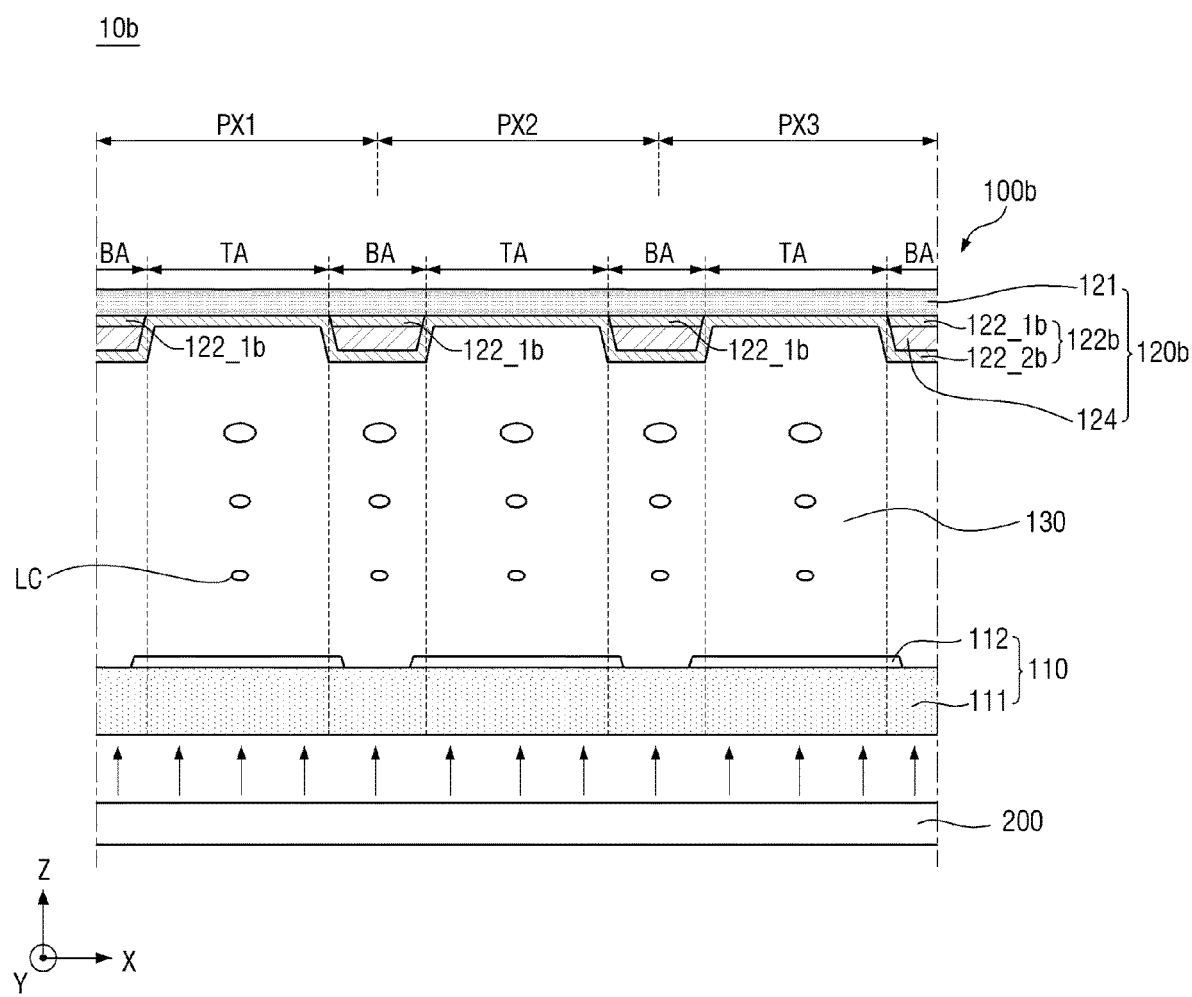
FIG. 4 is a cross-sectional view illustrating a display device according to still another embodiment.
Figure 9:
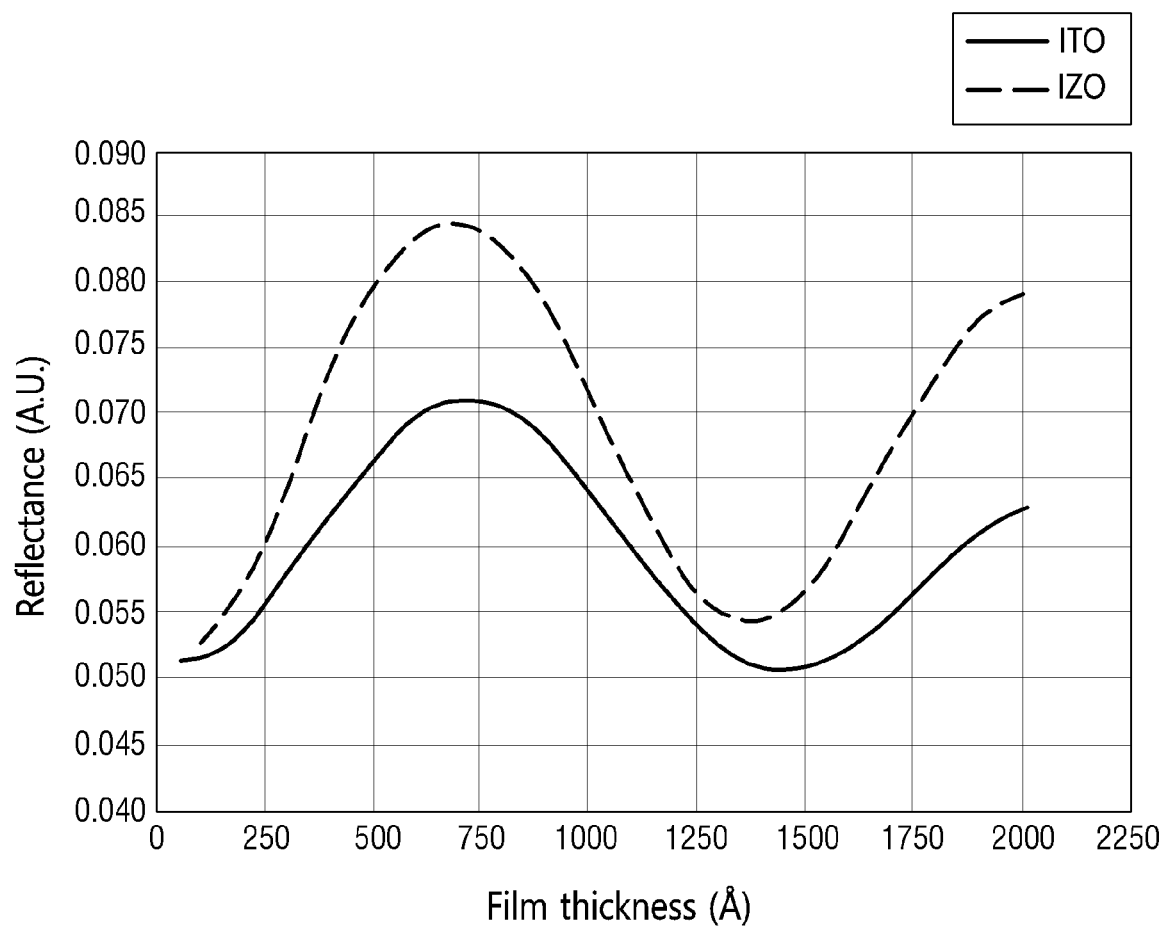
FIG. 9 is a graph illustrating a change in reflectance of a light transmitting area according to a change in thickness of a common electrode of a display device according to some embodiments.
Figure 10:
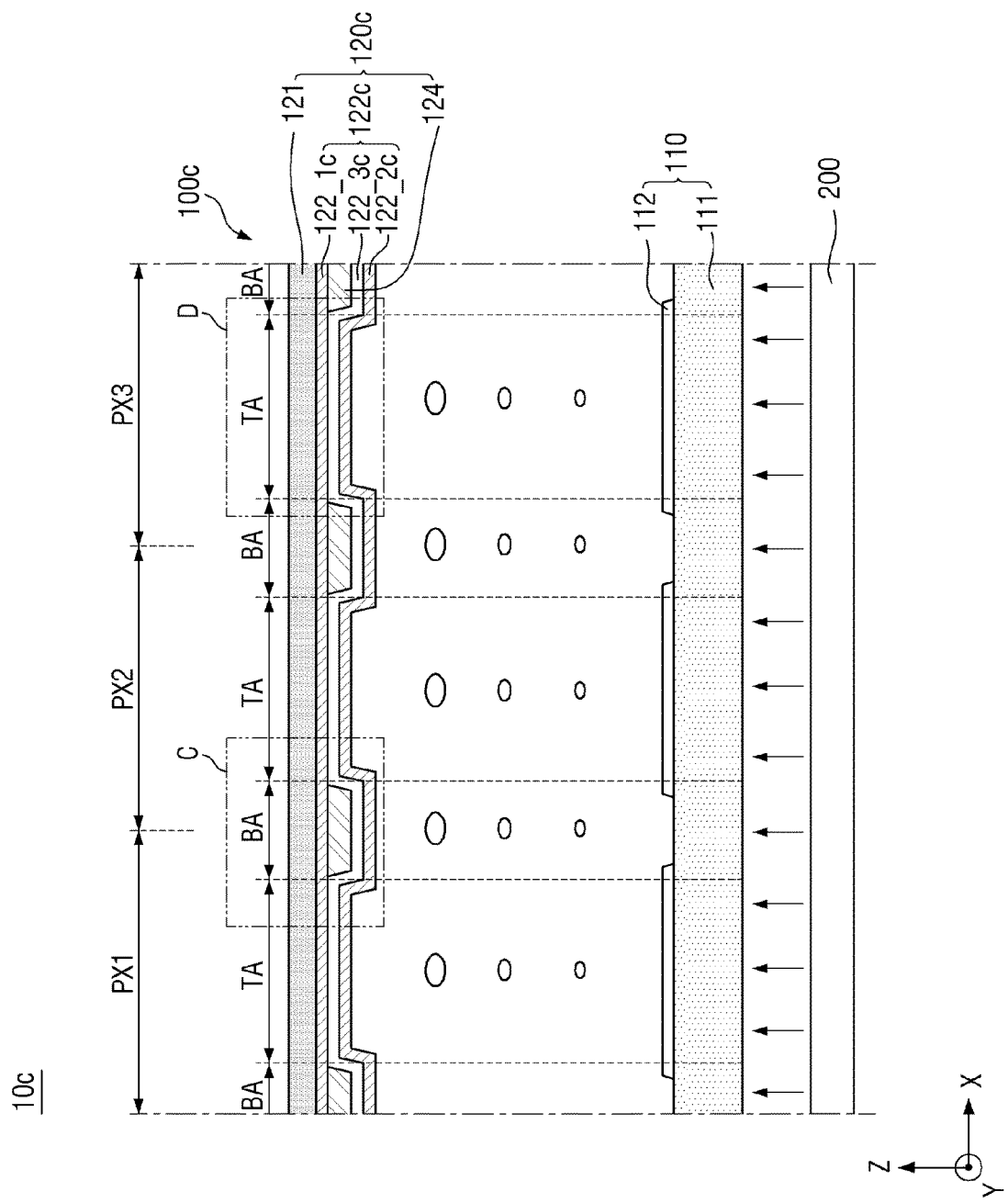
FIG. 10 is a cross-sectional view illustrating a display device according to still another embodiment.
Figure 16:
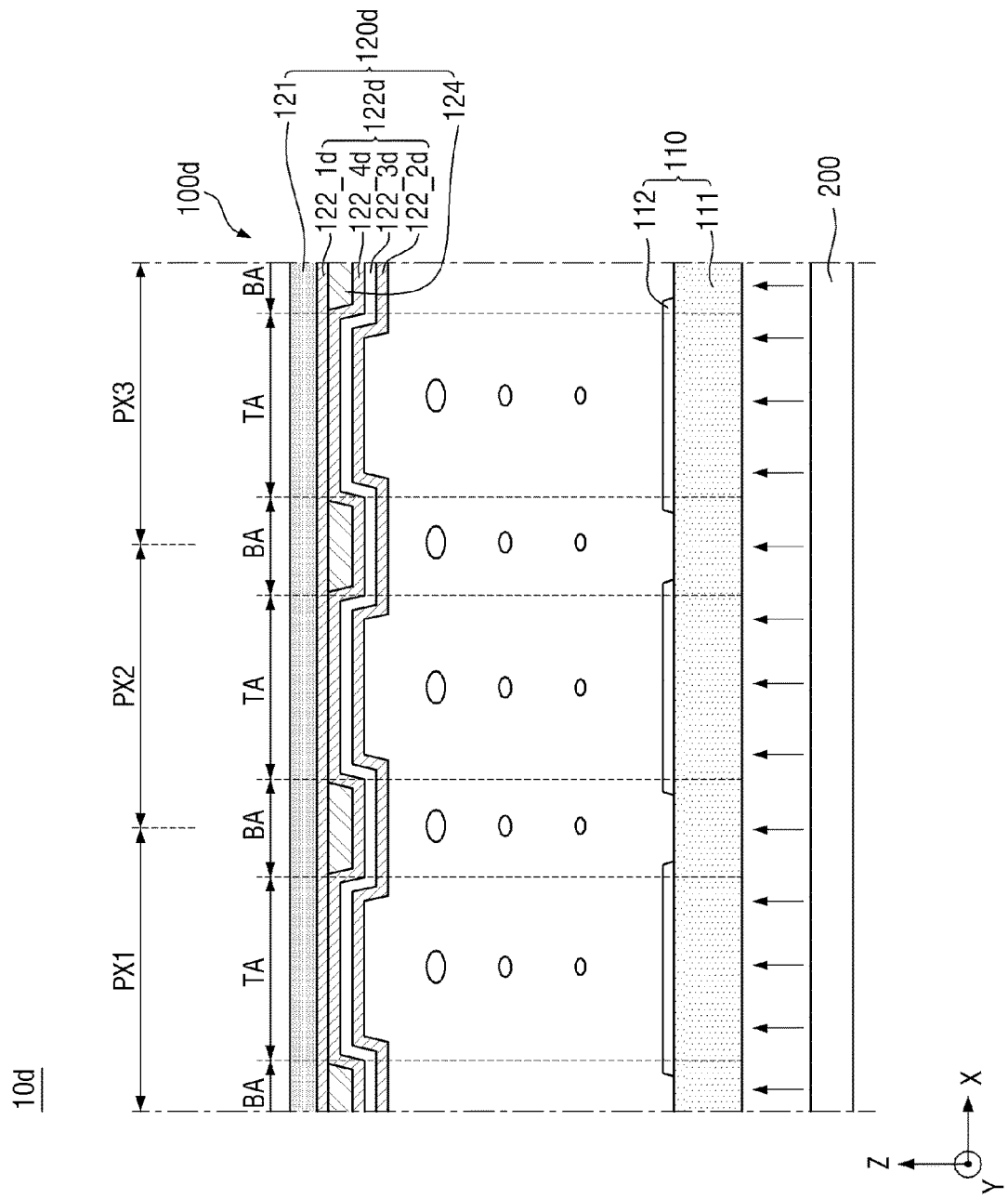
FIG. 16 is a cross-sectional view illustrating a display device according to still another embodiment.

In the embodiments of FIGS. 4, 10, and 16, the first common electrode layer 122_1*b*, 122_1*c*, 122_1*d* may be replaced with a transparent insulating layer 123. Hereinafter, a description of optical characteristics in the case where the first common electrode layer 122_1 is disposed in FIGS. 5 to 9 may be similarly applied to the case where the first common electrode layer 122_1 is replaced with the transparent insulating layer 123.

FIG. 4 is a cross-sectional view illustrating a display device according to still another embodiment.

Referring to FIG. 4, a display device 10*b* includes a first common electrode layer 122_1*b* that is disposed only between the light blocking member 124 and the second insulating substrate 121. As described above, a first common electrode layer 122_1*b* may be replaced with the transparent insulating layer 123 of FIG. 3.

The first common electrode layer 122_1*b* may be located only between the second insulating substrate 121 and the light blocking member 124. The first common electrode layer 122_1*b* does not connect with an entire length of the second insulating substrate 121, but only connects with the insulating substrate 121 at intervals of the light blocking area BA. In other words, in the display area DA, the first common electrode layer 122_1*b* may be disposed only in the light blocking area BA.

A portion of the second common electrode layer 122_2*b* may be disposed on one surface of the second insulating substrate 121, and another portion of the second common electrode layer 122_2*b* may be disposed on one surface of the light blocking member 124.

That is, in the light transmitting area TA, the second insulating substrate 121 and the second common electrode layer 122_2*b* are sequentially located along the thickness direction Z, and in the light blocking area BA, the second insulating substrate 121, the first common electrode layer 122_1*b*, the light blocking member 124, and the second common electrode layer 122_2*b* may be alternately sequentially located along the thickness direction Z.

The first common electrode layer 122_1*b* may have a thickness capable of reducing external light reflection in the light blocking area BA. For example, the first common electrode layer 122_1*b* may have a thickness of 150 Å to 400 Å. As another example, the first common electrode layer 122_1*b* may have a thickness of about 260 Å to about 320 Å.

The second common electrode layer 122_2*b* may have a thickness capable of reducing external light reflection in the light transmitting area TA. For example, the second common electrode layer 122_2*b* may have a thickness of about 1300 Å to 1400 Å. As another example, the second common electrode layer 122_2*b* may have a thickness of about 1350 Å.

Hereinafter, the external light reflection reduction of the display device according to the above-described embodiment will be described. The external light reflection reduction function will be described based on the embodiment of FIG. 2. Although the external light reflection reduction function will be described based on the embodiment of FIG. 2, it will be applied to not only the embodiment of FIG. 2 but also the embodiment of FIG. 3 including the transparent insulating layer 123 having optical characteristics the same as or similar to those of the first common electrode layer 122_1 of FIG. 2 or the embodiment of FIG. 4 or FIGS. 10 to 16 including the first common electrode layers 122_1b, 122_1c, and 122_1d, respectively, and other relevant sections herein.

Figure 5:
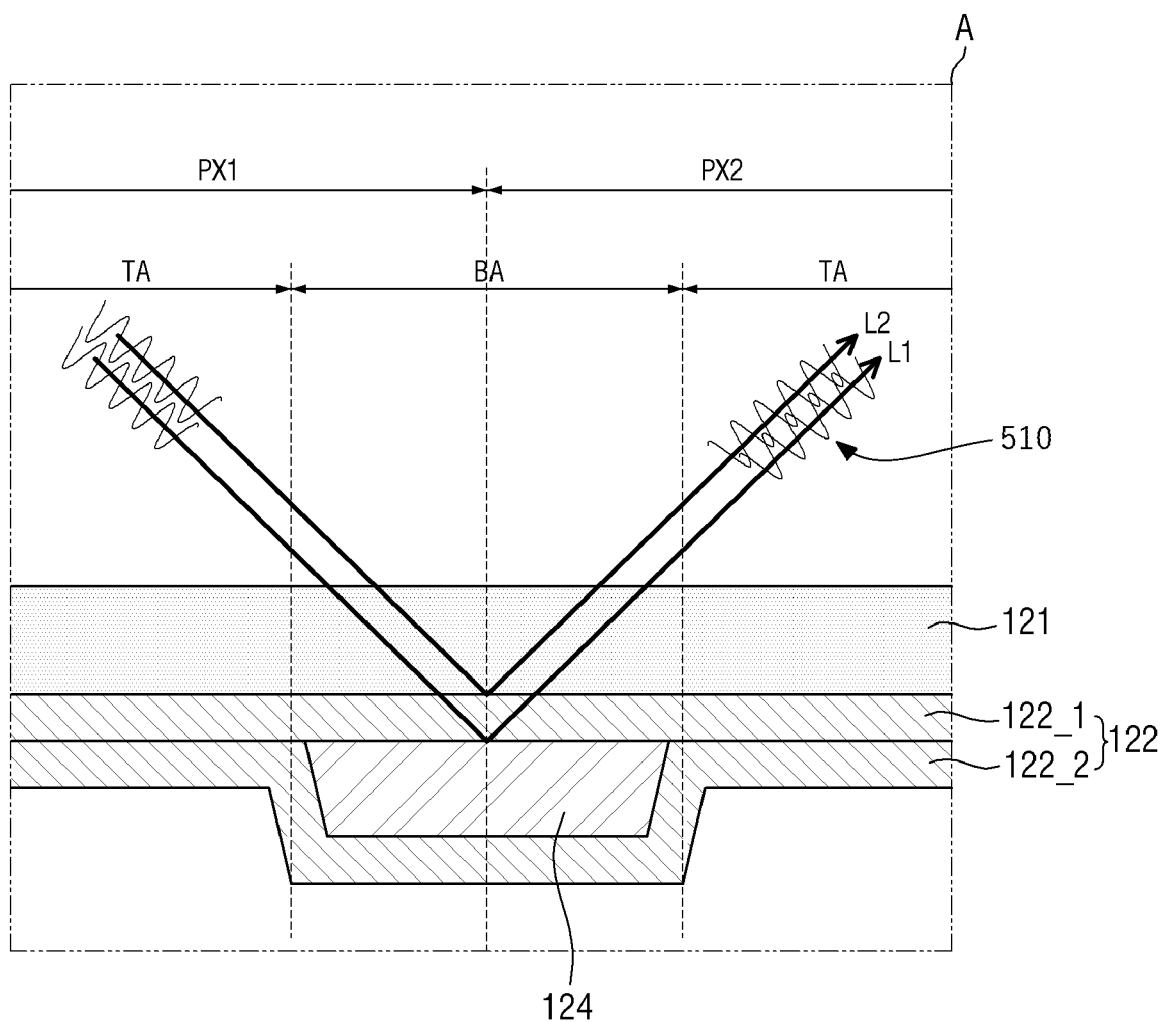
FIG. 5 is an enlarged view of the portion 'A' of FIG. 2.
Figure 6:
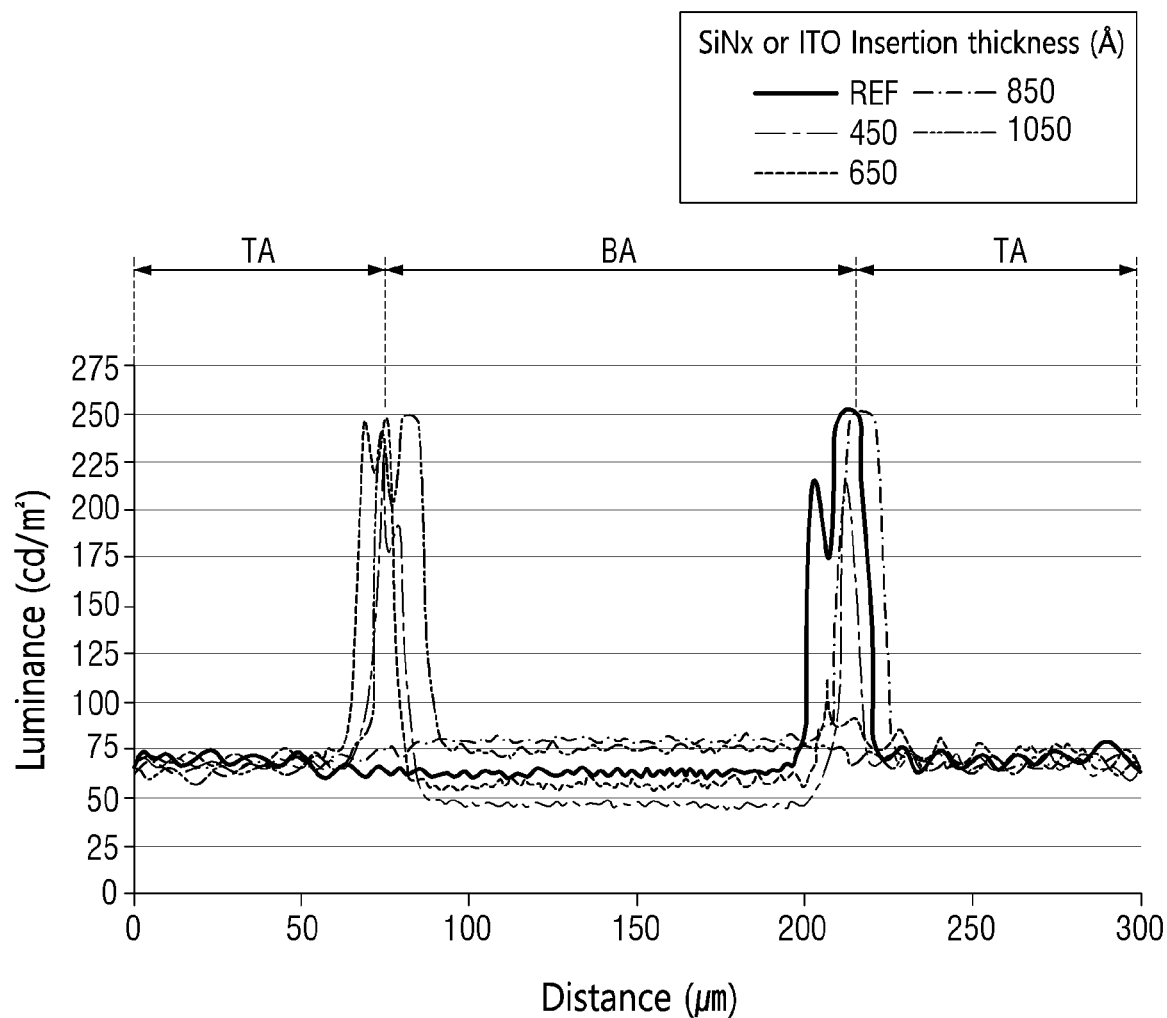
FIG. 6 is a graph illustrating a result of measuring luminance around a light blocking area of a display device in a first direction according to some embodiments.
Figure 7:
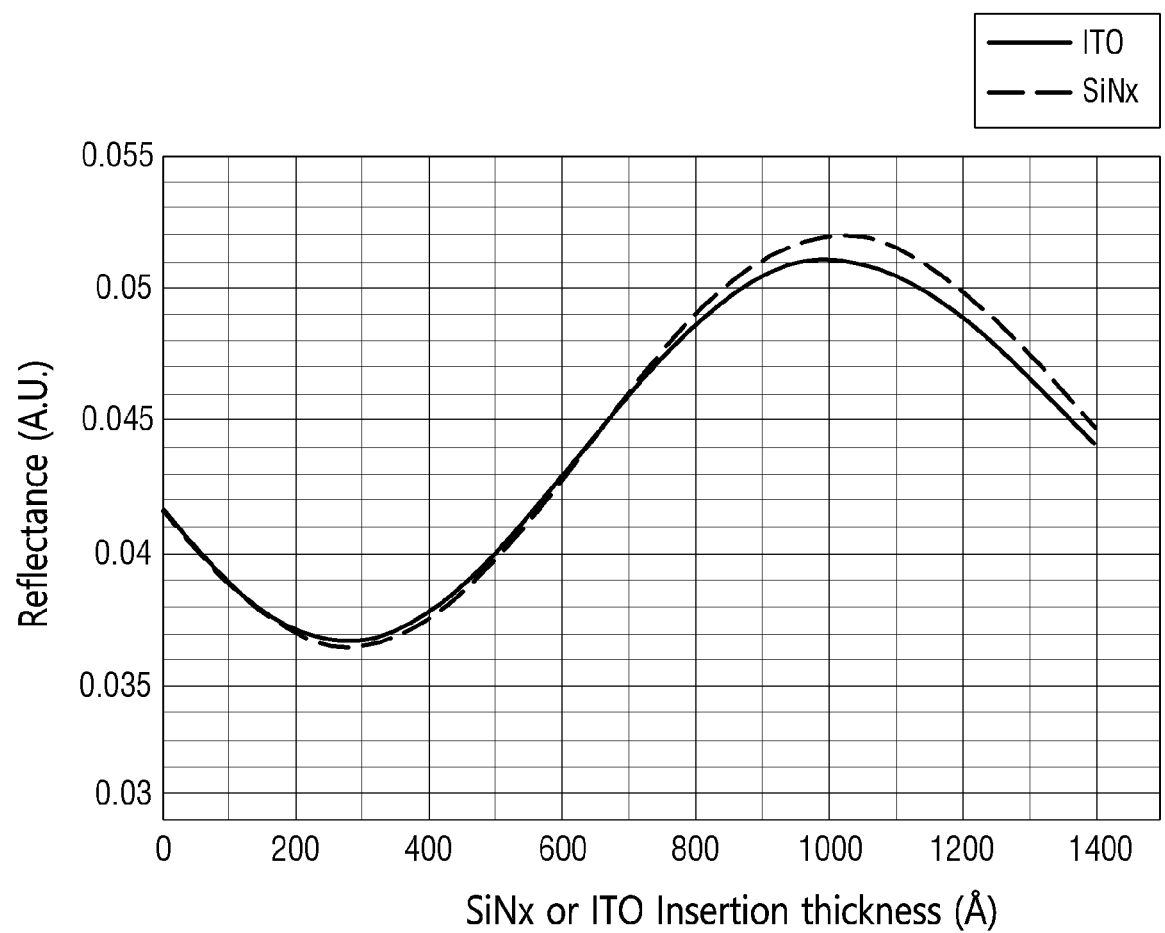
FIG. 7 is a graph illustrating a change in reflectance of a light blocking area according to a change in thickness of a first common electrode layer of a display device, according to an embodiment.
Figure 8:
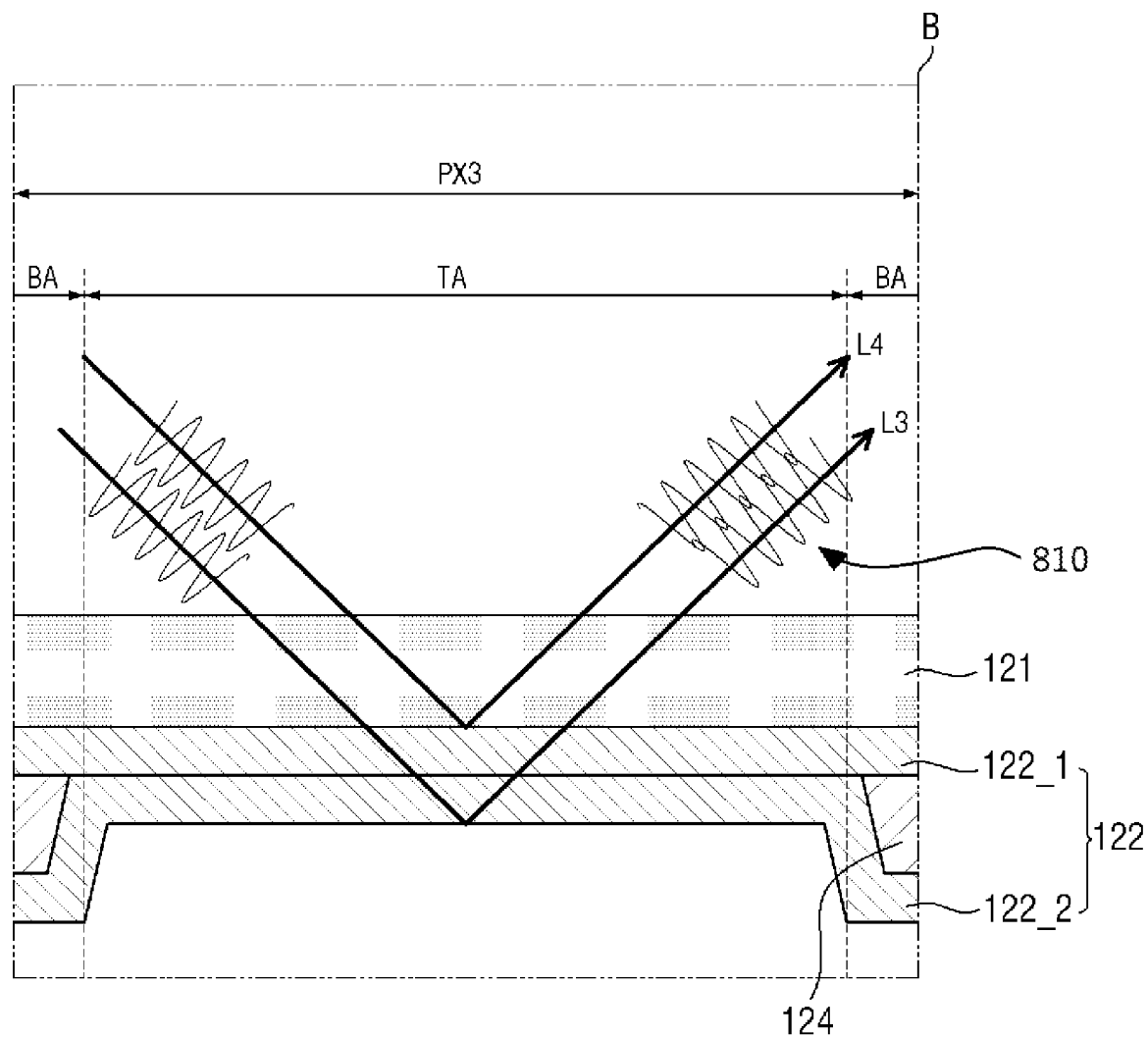
FIG. 8 an enlarged view of the portion 'B' of FIG. 2.

FIG. 5 is an enlarged view of the portion 'A' of FIG. 2, and FIG. 6 is a graph illustrating a result of measuring luminance around a light blocking area BA of a display device in a first direction according to some embodiments. FIG. 7 is a graph illustrating a change in reflectance of a light blocking area according to a change in thickness of a first common electrode layer of a display device, according to an embodiment. FIG. 8 an enlarged view of the portion 'B' of FIG. 2. FIG. 9 is a graph illustrating a change in reflectance of a light transmitting area according to a change in thickness of a common electrode of a display device according to some embodiments.

Referring to FIG. 5, the first common electrode layer 122_1 may induce destructive interference 510 of external light L1 reflected from the other surface of the light blocking member 124 and external light L2 reflected from the other surface of the first common electrode layer.

Hereinafter, in FIG. 6, whether reflectance and luminance are reduced according to the insertion of the first common electrode layer 122_1 or the transparent insulating layer 123 between the light blocking member 124 and the second insulating substrate 121 will be demonstrated. FIG. 6 illustrates a transparent insulating layer 123 including silicon nitride (SiN$_x$). Similar results may be obtained when the transparent insulating layer 123 is replaced with the first common electrode layer 122_1 having a refractive index of 1.8 to 2.2 which is in a range similar to that of silicon nitride (SiN$_x$).

FIG. 6 illustrates a result of measuring luminance in the light blocking area BA and the light transmitting area TA when the transparent insulating layer 123 including silicon nitride (SiN$_x$) is disposed between the second insulating substrate 121 and the light blocking member 124.

As illustrated in FIG. 6, when the thickness of the transparent insulating layer 123 is about 450 Å, the light blocking area BA has a luminance value of 50 cd/m$^2$ or less which is lower than the reference luminance value measured when the transparent insulating layer 123 is not used. Further, when the thickness of the transparent insulating layer 123 is about 1050 Å, the light blocking area BA has a luminance value of about 75 cd/m$^2$, which is higher than the reference luminance value. In contrast, the luminance of the light transmitting area TA does not vary greatly between 50 and 75 cd/m$^2$ despite the change in thickness of the transparent insulating layer 123. The boundary between the light blocking area BA and the light transmitting area TA may have a relatively high luminance value due to scattering of light or reflection by a metallic member.

It may be ascertained from measurements and experimental results that the reflectance of the light blocking area BA and the resulting luminance may be reduced according to the thickness of the layer disposed between the second insulating substrate 121 and the light blocking member 124 and having a refractive index of 1.8 to 2.2.

Although FIG. 6 illustrates a result of measuring luminance of the light blocking area BA based on the first direction X, even when measured along the second direction Y, similar results to those obtained when measured along the first direction X may be obtained.

Referring to FIGS. 5 and 7, FIG. 7 illustrates the results of measuring the reflectance of the light blocking area BA according to the thickness of the first common electrode layer 122_1 including indium tin oxide and the transparent insulating layer 123 including silicon nitride (SiN$_x$).

It may be ascertained from measurements and experimental results that when the thickness of the first common electrode layer 122_1 or the transparent insulating layer 123 is about 400 Å or less, the thickness of the first common electrode layer 122_1 or the transparent insulating layer 123 in the light blocking area has a reflectance of 0.0365 to 0.0415, which is lower than that of a section in which the thickness is greater than about 400 Å. The reason for this is that, when the thin film has a refractive index greater than the refractive index of the adjacent medium and the thickness of the thin film is smaller than the wavelength of incident light, destructive interference may occur regardless of an optical path difference depending on the thickness.

Further, it may be ascertained from experimental results that when the thickness of the first common electrode layer 122_1 or the transparent insulating layer 123 is about 150 Å to 400 Å, the reflectance of the light blocking area BA is 0.0365 to 0.0375. As illustrated in FIG. 7, the reason for this that when the thickness of the first common electrode layer 122_1 or the transparent insulating layer 123 is 150 Å or less, destructive interference due to reflection does not occur well, so the reflectance of the light blocking area BA may increase.

Moreover, it may be ascertained from experimental results that when the thickness of the first common electrode layer 122_1 or the transparent insulating layer 123 is about 260 Å to 320 Å, the reflectance of the light blocking area BA is about 0.0365 to 0.0369, which has the lowest reflectance range. In particular, it may be ascertained from experimental results that when the thickness of the first common electrode layer 122_1 or the transparent insulating layer 123 is about 300 Å, the reflectance of light blocking area BA is lowest.

Although FIG. 7 illustrates the first common electrode layer 122_1 including indium tin oxide (ITO) or the transparent insulating layer 123 including silicon nitride (SiN$_x$), similar results may be obtained even when the first common electrode layer 122_1 is made of indium zinc oxide, zinc oxide, or the like having a refractive index range similar to that of indium tin oxide or silicon nitride (SiN$_x$).

Hereinafter, in FIG. 8 and FIG. 9, the reduction of external light reflection in the light transmitting area TA will be described in detail.

Referring to FIG. 8, the common electrode 122 may induce destructive interference 810 between external light L3 reflected from one surface of the second common electrode layer 122_2 and external light L4 reflected from the other surface of the first common electrode layer 122_1.

The common electrode 122 may have a thickness that induces destructive interference of reflected external light. For example, the thickness of the common electrode 122 may be about 1100 Å to 1600 Å. As another example, the thickness of the common electrode 122 may be about 1300 Å to 1400 Å. As another example, the thickness of the common electrode 122 may be about 1350 Å.

The thickness of the common electrode 122 may be the sum of the thickness of the first common electrode layer 122_1 and the thickness of the second common electrode layer 122_2. For example, the thickness of the first common electrode layer 122_1 may be 150 Å to 400 Å, and the thickness of the second common electrode layer 122_2 may be 950 Å to 1200 Å. As another example, the thickness of the first common electrode layer 122_1 may be about 290 Å to 310 Å, and the thickness of the second common electrode layer 122_2 may be about 1040 Å to 1060 Å.

Referring to FIGS. 8 and 9, it may be ascertained through experimental results and measurements that when the thickness of the common electrode 122 is about 1100 Å to 1600 Å, the common electrode 122 has relatively lower reflectance than the peripheral section. Specifically, when the common electrode 122 includes indium tin oxide, it has a reflectance of about 0.051 to 0.057, and when the common electrode 122 includes indium zinc oxide, it has a reflectance of about 0.054 to 0.062.

As another example, when the thickness of the common electrode 122 is about 1300 Å to 1400 Å, the reflectance of the light transmitting area TA is about 0.051 to 0.53 when the common electrode 122 includes indium tin oxide, and is about 0.054 to 0.055 when the common electrode 122 includes indium zinc oxide.

Furthermore, when the common electrode 122 includes indium tin oxide and has a thickness of about 1350 Å, it may be confirmed that the reflectance of the light transmitting area TA has a minimum value of about 0.051.

Referring to FIGS. 6 to 9, when the thickness of the first common electrode layer 122_1 is 150 Å to 400 Å and the thickness of the second common electrode layer 122_2 is 950 Å to 1200 Å, in both the light transmitting area TA and the light blocking area BA, an effect of reducing external light reflection may be exhibited. Furthermore, when the thickness of the first common electrode layer 122_1 is about 290 Å to 310 Å and the thickness of the second common electrode layer 122_2 is about 1040 Å to 1060 Å, in both the light transmitting area TA and the light blocking area BA, an effect of reducing external light reflection may be maximized.

As described above, the first common electrode layer 122_1 may be replaced with a transparent insulating layer 123, and an destructive interference configured to reduce external light reflection may be induced between external light reflected from the upper side surface of the transparent insulating layer 123 of FIG. 3 and external light reflected from the lower side surface of the second common electrode layer 122_2. Further, even when the first common electrode layer 122_1 or the transparent insulating layer 123 is disposed only in the light blocking area BA as described in the embodiment of FIG. 4, destructive interference to reduce external light reflection may be induced between external light reflected from the upper side surface of the second common electrode layer 122_2 and external light reflected from the lower side surface of the second common electrode layer 122_2.

Figure 11:
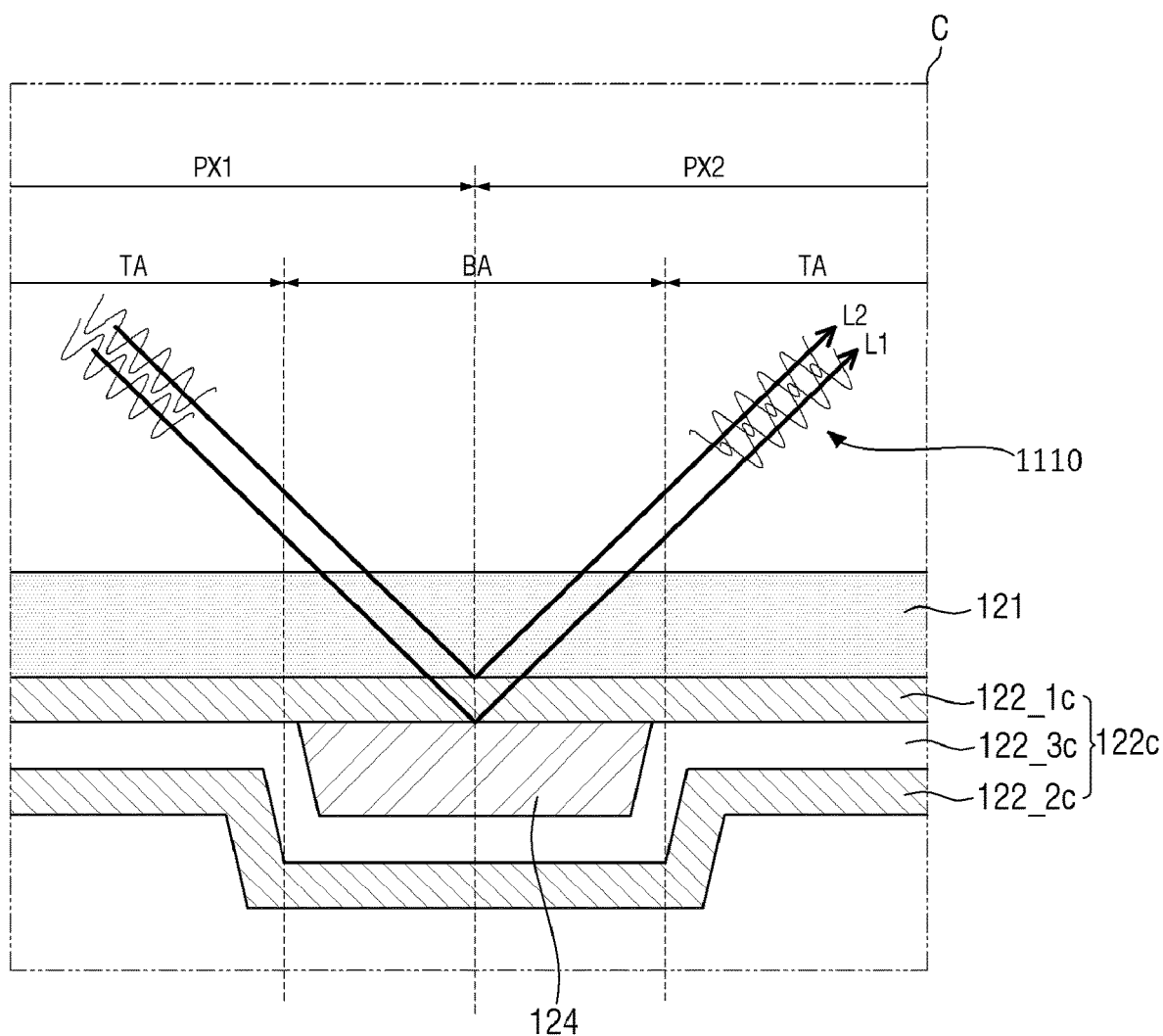
FIG. 11 an enlarged view of the portion 'C' of FIG. 10.
Figure 13:
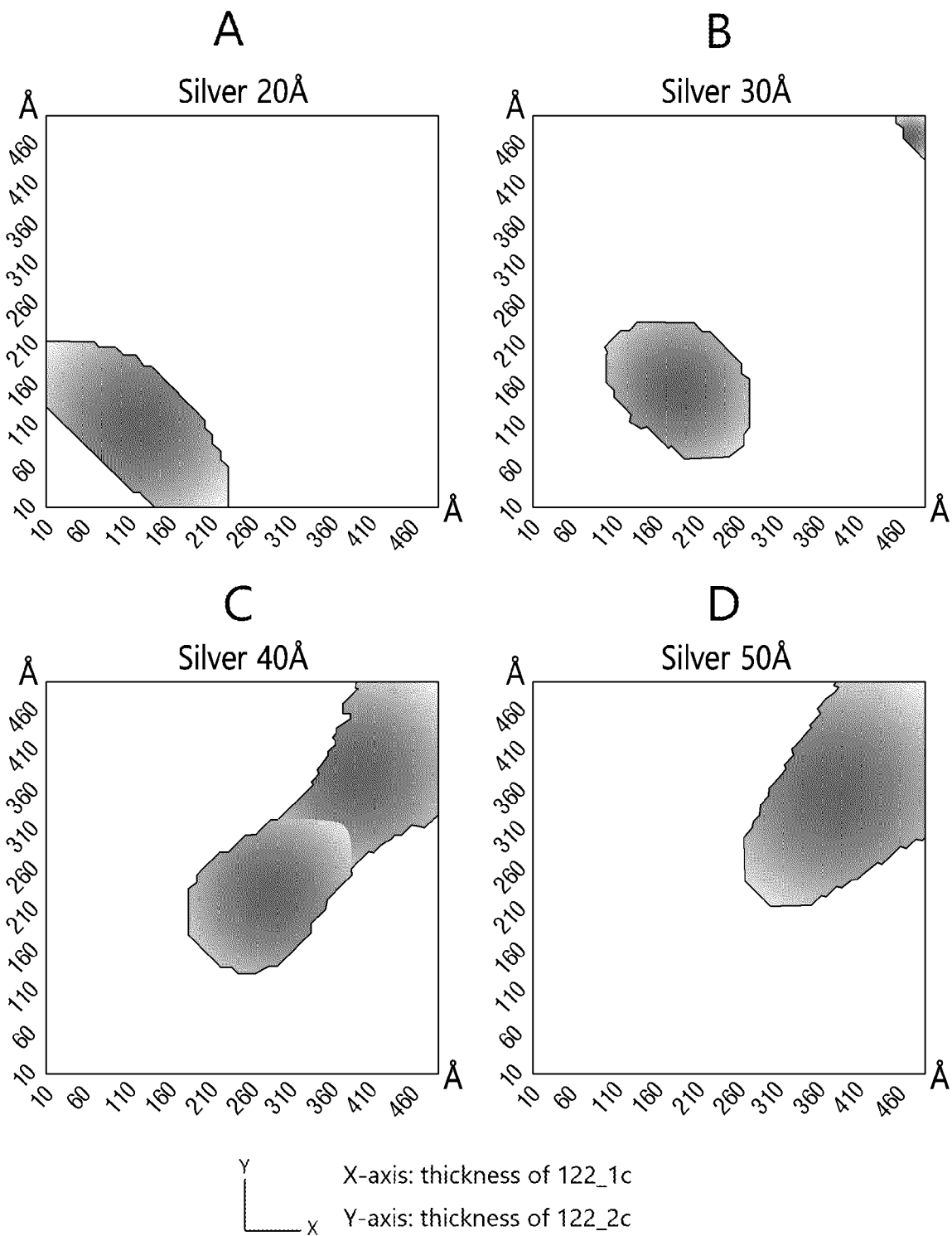
FIG. 13 shows graphs illustrating reflectance according to a change in thickness of a first common electrode layer and a second common electrode layer.
Figure 14:
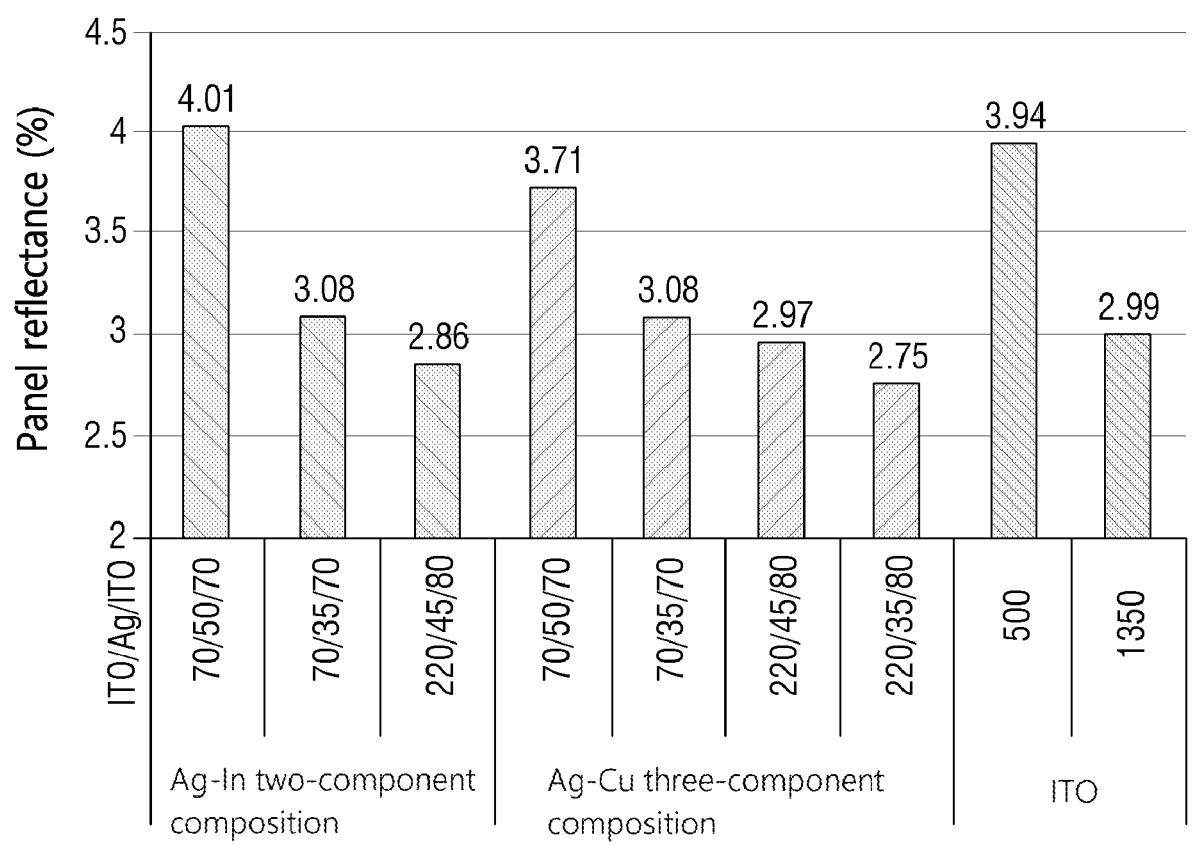
FIG. 14 is a graph illustrating reflectance according to a material of a second common electrode layer in the display device of FIG. 10.

FIG. 10 is a cross-sectional view illustrating a display device according to still another embodiment. FIG. 11 an enlarged view of the portion 'C' of FIG. 10, FIG. 12 an enlarged view of the portion 'D' of FIG. 10. FIG. 13 illustrates graphs illustrating reflectance according to a change in thickness of a first common electrode layer and a second common electrode layer. FIG. 14 is a graph illustrating reflectance according to a material of a second common electrode layer in the display device of FIG. 10.

Referring to FIG. 10, a display device 10*c* according to an embodiment of FIG. 4 includes a common electrode 122*c* that further includes a metal layer 122_3*c* disposed between a first common electrode layer 122_1*c* and a second common electrode layer 122_2*c*.

The metal layer 122_3*c* is disposed on one surface of the first common electrode layer 122_1*c*. Here, the metal layer 122_3*c* may be disposed between the first common electrode layer 122_1*c* and the second common electrode layer 122_2*c* or between the light blocking member 124 and the second common electrode layer 122_2*c*.

At least a portion of the metal layer 122_3*c* may be directly disposed on one surface of the first common electrode layer 122_1*c*, and another portion of the metal layer 122_3*c* may not be directly disposed on one surface of the first common electrode layer 122_1*c*. For example, another portion of the metal layer 122_3*c* may be directly disposed on one surface of the light blocking member 124.

The metal layer 122_3*c* may include a metal material having a low resistance. For example, the metal layer 122_3*c* may include silver, aluminum, copper, or an alloy including at least one of them.

The metal layer 122_3*c* may be formed of a two-component composition including silver. For example, the metal layer 122_3*c* may be Ag—In or Ag—Au. The metal layer 122_3*c* may be formed of a three-component composition including at least one of silver and copper. For example, the metal layer 122_3*c* may be formed of Ag—Pb—Cu. As another example, the metal layer 122_3*c* may be formed of Au—Ag—Cu.

The metal layer 122_3*c* may have a thickness of about 20 Å to about 50 Å. When the thickness of the metal layer 122_3*c* is less than 20 Å, the transmittance due to aggregation decreases and a continuous film is difficult to form, thereby increasing a resistance value, and when the thickness of the metal layer 122_3*c* is more than 50 Å, transmittance rapidly decreases.

The first common electrode layer 122_1*c*, the metal layer 122_3*c*, and the second common electrode layer 122_2*c* may be sequentially stacked to form a highly conductive transparent electrode of a multilayer thin layer. As described above, the first common electrode layer 122_1*c* and the second common electrode layer 122_2*c* may have a thickness capable of reducing external light reflection of the display panel 100.

The second common electrode layer 122_2*c* may have a thickness to reduce the reflection of external light in the light transmitting area TA. Here, the thickness of the second common electrode layer 122_2*c* may be a thickness capable of maximizing destructive interference among external light reflected from the other surface of the first common electrode layer 122_1*c*, external light reflected from the other surface of the metal layer 122_3*c*, external light reflected from the other surface of the second transparent layer, and external light reflected from the other surface of the second transparent layer. For example, the thickness of the second common electrode layer 122_2*c* may be about 100 Å to 300 Å. As another example, the thickness of the second common electrode layer 122_2*c* may be about 210 Å to 230 Å. As another example, the thickness of the second common electrode layer 122_2*c* may be about 220 Å.

The thickness of the second common electrode layer 122_2*c* may be changed depending on the material and thickness of the first common electrode layer 122_1*c* and the material and thickness of the metal layer 122_3*c* to be described later. For example, the thickness of the metal layer 122_3*c* may be 20 Å, the thickness of the first common electrode layer 122_1*c* may be about 80 Å to 180 Å, and the thickness of the second common electrode layer 122_2*c* may be about 80 Å to 180 Å. As another example, the thickness of the metal layer 122_3*c* may be 30 Å, the thickness of the first common electrode layer 122_1*c* may be about 140 Å to 240 Å, and the thickness of the second common electrode layer 122_2*c* may be about 120 Å to 220 Å. As another example, the thickness of the metal layer 122_3c may be 40 Å, the thickness of the first common electrode layer 122_1c may be 220 Å or more, and the thickness of the second common electrode layer 122_2c may be about 170 Å or more. As another example, the thickness of the metal layer 122_3c may be 50 Å, the thickness of the first common electrode layer 122_1c may be about 280 Å or more, and the thickness of the second common electrode layer 122_2c may be about 240 Å or more.

The common electrode 122c may have a thickness configured to reduce both reflectance of the light transmitting area TA and reflectance of the light blocking area BA. The thickness of the first common electrode layer 122_1c may be a thickness that minimizes the reflection of external light of the light blocking area BA. For example, the thickness of the first common electrode layer 122_1c may be about 150 Å to 400 Å, the thickness of the metal layer 122_3c may be about 20 Å to 50 Å, and the thickness of the second common electrode layer 122_2c may be about 100 Å to 300 Å. As another example, the thickness of the first common electrode layer 122_1c may be about 300 Å, the thickness of the metal layer 122_3c may be 40 Å, and the thickness of the second common electrode layer 122_2c may be 220 Å.

The light blocking member 124 may be disposed between the first common electrode layer 122_1c and the metal layer 122_3c. As described above, the light blocking member 124 may define the light blocking area BA and the light transmitting area TA.

The first common electrode layer 122_1c, the metal layer 122_3c, the second common electrode layer 122_2c, and the light blocking member 124 may be differently arranged depending on the light blocking area BA or the light transmitting area TA. For example, in the light blocking area BA, the second insulating substrate 121, the first common electrode layer 122_1c, the light blocking member 124, the metal layer 122_3c, and the second common electrode layer 122_2c are sequentially arranged downwards. Further, in the light transmitting area TA, the second insulating substrate 121, the first common electrode layer 122_1c, the light blocking member 124, and the second common electrode layer 122_2c may be sequentially arranged downwards.

The light blocking member 124 may be surrounded by the first common electrode layer 122_1c and the metal layer 122_3c. For example, the other surface of the light blocking member 124 may be surrounded by the first common electrode layer 122_1c, and one surface and both side surfaces of the light blocking member 124 may be surrounded by the metal layer 122_3c.

Hereinafter, the reduction of external light reflection in the light blocking area BA and the light transmitting area TA will be described with reference to FIGS. 11 to 14.

Referring to FIG. 11, as in the case of FIG. 5, in the light blocking area BA, the first common electrode layer 122_1c may have a thickness inducing destructive interference 1110 between the external light L2 reflected from the other surface of the first common electrode layer 122_1c and the external light L1 reflected from one surface of the light blocking member 124.

When the thickness of the first common electrode layer 122_1c is about 150 Å to 400 Å, the reflectance of the light blocking area BA may be 0.0365 to 0.0375.

Because reflectance reduction of the first common electrode layer 122_1c according to the arrangement, refractive index, and thickness of the first common electrode layer 122_1c is substantially the same as or similar to that of the embodiment of FIGS. 5 to 7, a detailed description thereof will be omitted.

Figure 12:
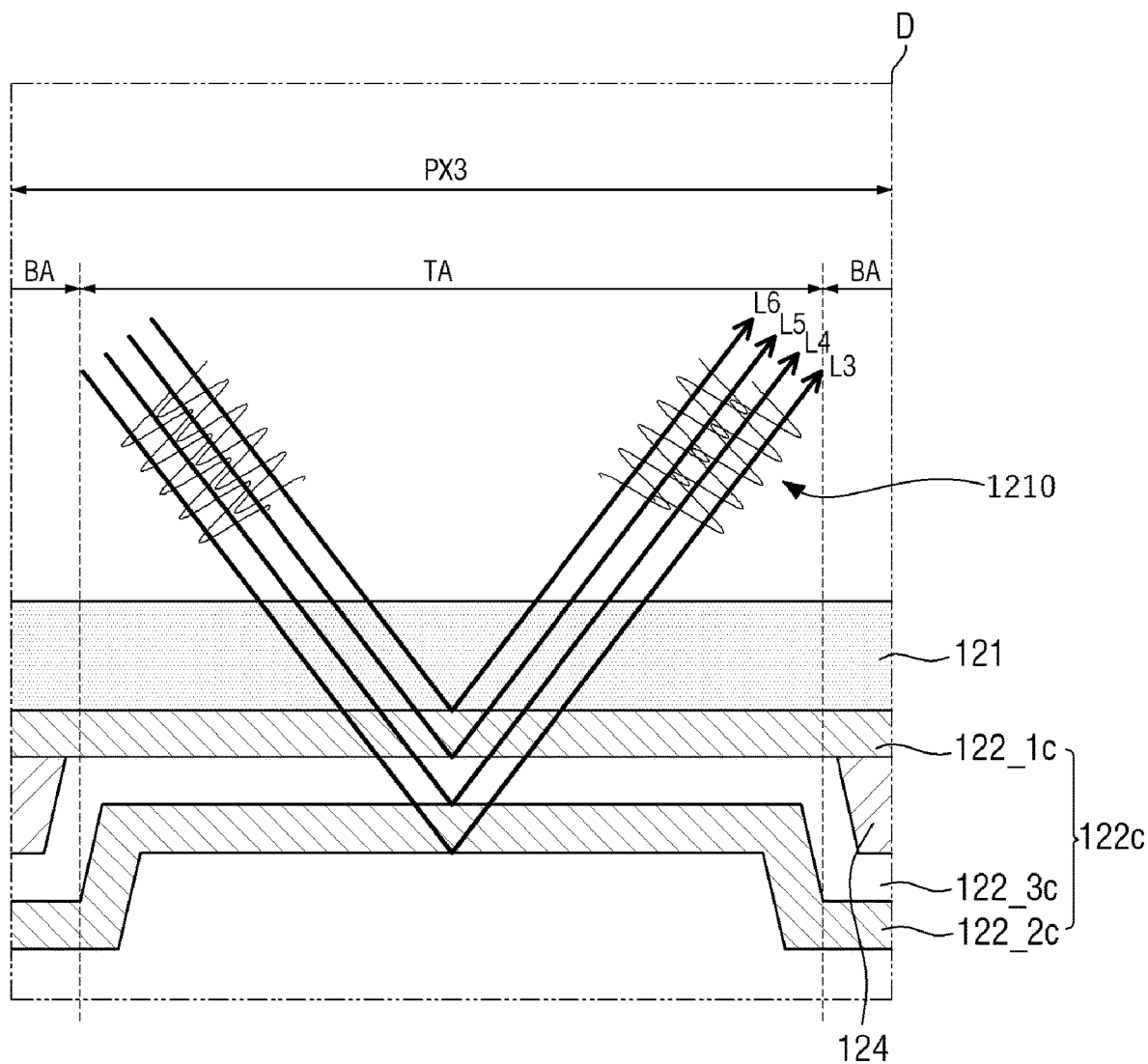
FIG. 12 an enlarged view of the portion 'D' of FIG. 10.

Referring to FIG. 12, the first common electrode layer 122_1c, the metal layer 122_3c, and the second common electrode layer 122_2c may induce destructive interference 1210 among external light L6 reflected from the other surface of the first common electrode layer 122_1c, external light L5 reflected from the other surface of the metal layer 122_3c, external light L4 reflected from the other surface of the second common electrode layer 122_2c, and external light L3 reflected from the other surface of the second common electrode layer 122_2c.

For convenience of explanation, the reflectance in the light transmitting area TA when the common electrode 122c is made of a single ITO material having a thickness of 1350 Å is referred to as reference reflectance. Here, the reference reflectance may be 0.0506. FIG. 13 illustrates a case where the metal layer 122_3c is made of silver and the first common electrode layer 122_1c and the second common electrode layer 122_2c are made of indium tin oxide. The shaded portions in the graphs of FIG. 13 illustrates thickness sections of the first common electrode layer 122_1c and the second common electrode layer 122_2c having reflectance lower than the reference reflectance in the case where the thickness of the metal layer 122_3c is 20 Å, 30 Å, 40 Å, or 50 Å. The horizontal axis of the graphs of FIG. 13 is the thickness of the first common electrode layer 122_1c, and the vertical axis thereof is the thickness of the second common electrode layer 122_2c.

Referring to FIGS. 12 and 13, the light transmitting area TA has a reflectance lower than the reference reflectance according to the thicknesses of the first common electrode layer 122_1c, the metal layer 122_3c, and the second common electrode layer 122_2c.

Referring to Graph A in the left upper end of FIG. 13, when the thickness of the metal layer 122_3c is 20 Å, the thickness of the first common electrode layer 122_1c is about 80 Å to 180 Å, and the thickness of the second common electrode layer 122_2c is about 80 Å to 180 Å, it may be ascertained from experimental results that the reflectance of the light transmission area TA is lower than the reference reflectance.

Referring to Graph B in the right upper end of FIG. 13, when the thickness of the metal layer 122_3c is 30 Å, the thickness of the first common electrode layer 122_1c is about 140 Å to 240 Å, and the thickness of the second common electrode layer 122_2c is about 120 Å to 220 Å, it may be ascertained from experimental results that the reflectance of the light transmission area TA is lower than the reference reflectance.

Referring to Graph C in the left lower end of FIG. 13, when the thickness of the metal layer 122_3c is 40 Å, the thickness of the first common electrode layer 122_1c is about 220 Å or more, and the thickness of the second common electrode layer 122_2c is about 170 Å or more, it may be ascertained from experimental results that the reflectance of the light transmission area TA is lower than the reference reflectance.

Referring to Graph D in the right lower end of FIG. 13, when the thickness of the metal layer 122_3c is 50 Å, the thickness of the first common electrode layer 122_1c is about 280 Å or more, and the thickness of the second common electrode layer 122_2c is about 240 Å or more, it may be ascertained from experimental results that the reflectance of the light transmission area TA is lower than the reference reflectance.

Referring to FIGS. 7 and 13, when the thickness of the first common electrode layer 122_1c is about 150 Å to 400 Å, the thickness of the metal layer 122_3c is about 20 Å to 50 Å, and the thickness of the second common electrode layer 122_2c is about 100 Å to 300 Å, it may be ascertained from experimental results that the external light reflectance in both the light blocking area BA and the light transmitting area TA may be reduced. Here, the thickness of the first common electrode layer 122_1c may be about 300 Å, the thickness of the metal layer 122_3c may be 40 Å, and the thickness of the second common electrode layer 122_2c may be about 220 Å.

FIG. 14 is a graph illustrating panel reflectance when the metal layer 122_3c is made of a two-component composition including Ag—In, when the metal layer 122_3c is made of a three-component composition including Ag—Cu, or when the metal layer 122_3c is not included. Here, the first common electrode layer 122_1c and the second common electrode layer 122_2c are made of indium tin oxide.

Referring to the right side of FIG. 14, when the common electrode 122c includes the metal layer 122_3c, it may be ascertained from experimental results that the common electrode 122c has a lower reflectance than the case where the common electrode 122c includes the metal layer 122_3c containing only the indium tin oxide and having a thickness of 1350 Å.

Referring to the left side of FIG. 14, when the metal layer 122_3c is composed of a two-component composition including silver and indium, the thickness of the first common electrode layer 122_1c is 220 Å, the thickness of the metal layer 122_3c is 45 Å, and the thickness of the second common electrode layer 122_2c is 80 Å, it may be ascertained from experimental results that the reflectance is 2.86.

Referring to the middle of FIG. 14, when the thickness of the first common electrode layer 122_1c is 220 Å, the thickness of the metal layer 122_3c is 35 Å, and the thickness of the second common electrode layer 122_2c is 80 Å, it may be ascertained from experimental results that the reflectance is 2.75. In this, case, the light transmitting area TA has a lower reflectance than the case where the metal layer 122_3c is composed of a two-component composition including silver and indium without decreasing transmittance, or the case where the metal layer 122_3c is made only of an indium tin oxide material. Besides, when the metal layer 122_3c is composed of a three-component composition including silver and copper, a thin device may be implemented compared when the metal layer 122_3c is composed of a two-component composition including silver and indium.

Figure 15:
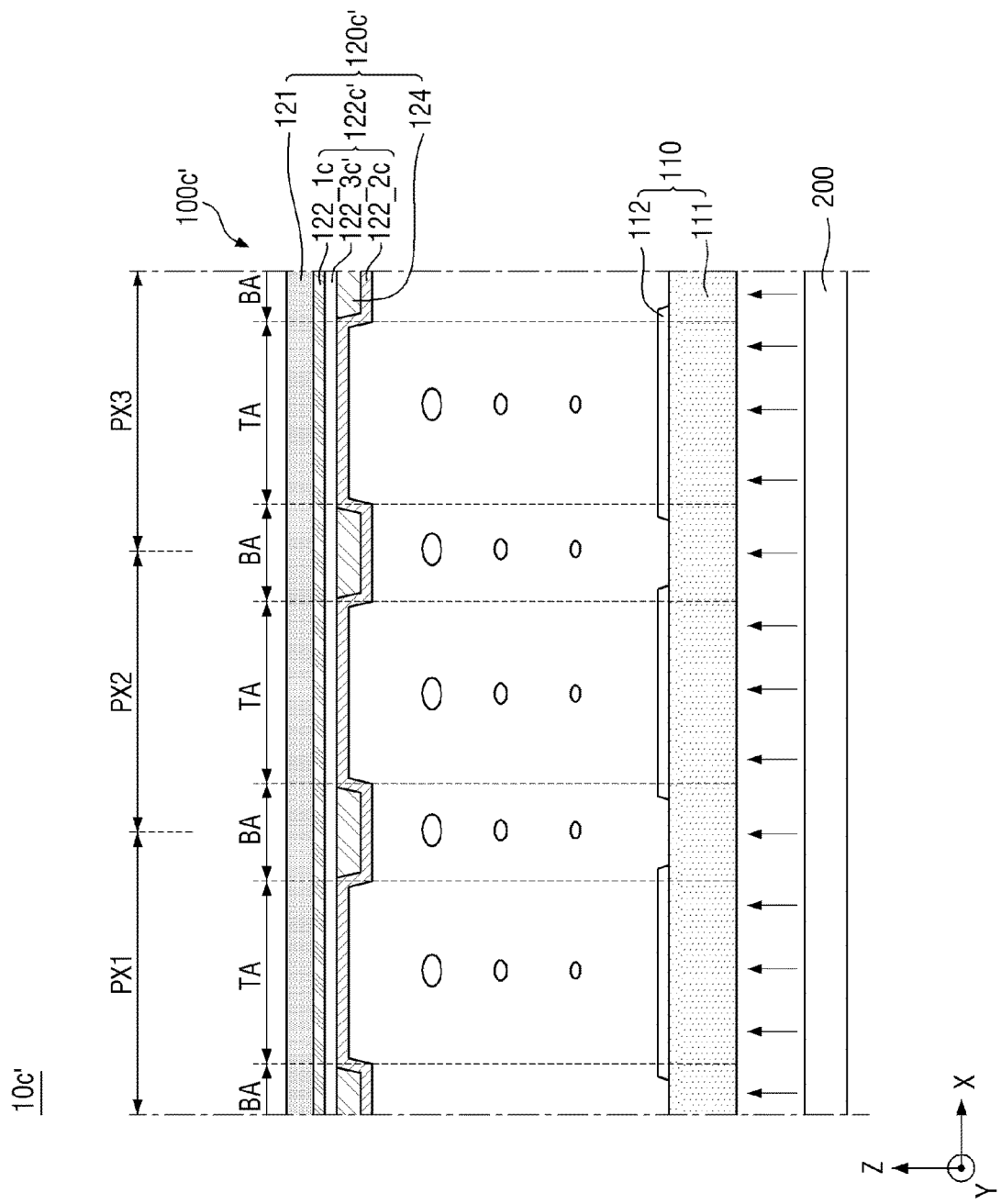
FIG. 15 is a cross-sectional view illustrating a display device according to still another embodiment.

FIG. 15 is a cross-sectional view illustrating a display device according to still another embodiment.

Referring to FIG. 15, a display device 10c' of FIG. 15 includes a metal layer 122_3c' that is disposed between the first common electrode layer 122_1c and the light blocking member 124 in the light blocking area BA.

A second substrate 120c' includes the second insulating substrate 121, a common electrode 122c', and the light blocking member 124. The common electrode 122c' may include a first common electrode layer 122_1c, a metal layer 122_3c', and a second common electrode layer 122_2c.

The first common electrode layer 122_1c is disposed on one surface of the second insulating substrate 121. In an embodiment, the thickness of the first common electrode layer 122_1c may be 150 Å to 400 Å. In some embodiments, the thickness of the first common electrode layer 122_1c may be about 350 Å. In some embodiments, the thickness of the first common electrode layer 122_1c may be about 350 Å.

The metal layer 122_3c' may be directly disposed on one surface of the first common electrode layer 122_1c.

The metal layer 122_3c' may have a refractive index smaller than that of the second insulating substrate 121, the first common electrode layer 122_1c, the second common electrode layer 122_2c, and the light blocking member 124. In an embodiment, the refractive index of the metal layer 122_3c' may be about 0.1 to 0.2.

The metal layer 122_3c' may have a thickness sufficiently smaller than the wavelength of external light. In an embodiment, the metal layer 122_3c' may have a thickness of 20 Å to 50 Å.

In the light blocking area BA, the metal layer 122_3c' may induce destructive interference between at least one external light reflected from the other surface of the first common electrode layer 122_1c, or external light reflected from the other surface of the light blocking member 124, and external light reflected from the other surface of the metal layer 122_3c'. That is, the metal layer 122_3c' may be formed to have a thickness sufficiently smaller than the wavelength of incident light, and may be disposed between members having a refractive index larger than that of the metal layer 122_3c', thereby reducing the reflection of external light in both the light blocking area BA and the light transmitting area TA. In addition, because the metal layer 122_3c' is formed to have a thickness sufficiently smaller than the wavelength of incident light, the metal layer 122_3c' may not have a large influence on the thickness range of the first common electrode 122_1c to reduce the reflection of external light in the light blocking area BA.

The second common electrode layer 122_2c is disposed on one surface of the metal layer 122_3c'. In an embodiment, the thickness of the second common electrode layer 122_2c may be about 100 Å to 300 Å. In some embodiments, the thickness of the second common electrode layer 122_2c may be about 220 Å.

The light blocking member 124 is disposed between the metal layer 122_3c' and the second common electrode layer 122_2c. The other surface of the light blocking member 124 may be surrounded by the metal layer 122_3c', and one surface and one side surface may be surrounded by the second common electrode layer 122_2c.

In an embodiment, in the light blocking area BA, the second insulating substrate 121, the first common electrode layer 122_1c, the metal layer 122_3c', the light blocking member 124, and the second common electrode layer 122_2c are sequentially arranged along one side direction of the light blocking area BA. Further, in the light transmitting area TA, the second insulating substrate 121, the first common electrode layer 122_1c, the metal layer 122_3c', and the second common electrode layer 122_2c may be sequentially disposed along one side direction of the light blocking area BA.

Because the material, thickness, and refractive index of the first common electrode layer 122_1c, the material, thickness, and refractive index of the second common electrode layer 122_2c, and the material, thickness, and refractive index of the light blocking member 124, and the reduction of external light reflection in the light transmitting area TA may be substantially the same as or similar to those of FIG. 10, a detailed description thereof will be omitted.

FIG. 16 is a cross-sectional view illustrating a display device according to still another embodiment.

Referring to FIG. 16, a display device 10d of FIG. 16 is different from the display device 10c of FIG. 10 in that a common electrode 122d further includes a third common electrode layer 122_4d.

The second substrate 120d includes a second insulating substrate 121, a common electrode 122d, and a light blocking member 124. The common electrode 122d may include a first common electrode layer 122_1d, a second common electrode layer 122_2d, a metal layer 122_3d, and a third common electrode layer 122_4d.

The third common electrode layer 122_4d is disposed on one surface of the first common electrode layer 122_1d. Specifically, the third common electrode layer 122_4d may be disposed between the first common electrode layer 122_1d and the metal layer 122_3d or between the light blocking member 124 and the metal layer 122_3d.

At least a portion of the third common electrode layer 122_4d may be directly disposed on one surface of the first common electrode layer 122_1d. Another portion of the third common electrode layer 122_4d may not be directly disposed on one surface of the first common electrode layer 122_1d. For example, another portion of the third common electrode layer 122_4d may be directly disposed on one surface of the light blocking member 124.

The third common electrode layer 122_4d may have a refractive index that is substantially the same as or similar to that of the first common electrode layer 122_1d or the second common electrode layer 122_2d. The third common electrode layer 122_4d may have a refractive index different from that of the first common electrode layer 122_1d or the second common electrode layer 122_2d. For example, the refractive indices of the third common electrode layer 122_4d may be 1.7 to 2.2, respectively. As another example, the refractive index of the first common electrode layer 122_1d or the second common electrode layer 122_2d may be 1.8 to 2.0, and the refractive index of the third common electrode layer 122_4d may be 1.7 to 2.1. As another example, the refractive index of the third common electrode layer 122_4d may be 95% to 105% of the refractive index of the first common electrode layer 122_1d or the second common electrode layer 122_2d. As another example, an absolute value of a difference in refractive index between the third common electrode layer 122_4d and the first common electrode layer 122_1d or between the third common electrode layer 122_4d and the second common electrode layer 122_2d may be within 0.05.

The third common electrode layer 122_4d may have a refractive index greater than that of the light blocking member 124. For example, the refractive index of the third common electrode layer 122_4d may be 1.8 or more and less than 2.2, and the refractive index of the light blocking member 124 may be 1.6 or more and 1.8 or less.

The third common electrode layer 122_4d may have a refractive index greater than that of the second insulating substrate 121. For example, the refractive index of the third common electrode layer 122_4d may be 1.8 or more and less than 2.2, and the refractive index of the second insulating substrate 121 may be 1.4 or more and less than 1.6.

The third common electrode layer 122_4d may be made of the same material as the first common electrode layer 122_1d or the second common electrode layer 122_2d. Specifically, the third common electrode layer 122_4d may include a conductive material or an insulating material. For example, the third common electrode layer 122_4d may include indium tin oxide, indium zinc oxide, aluminum-doped zinc oxide (AZO), or zinc oxide.

The third common electrode layer 122_4d may have a thickness capable of reducing external light reflection. For example, the thickness of the third common electrode layer 122_4d may be 30 Å to 70 Å. Here, the thickness of the first common electrode layer may be 150 Å to 400 Å, the thickness of the metal layer 122_3d may be 50 Å to 20 Å, and the thickness of the second common electrode layer 122_2d may be 100 Å to 300 Å.

Similar to the embodiment of FIG. 3, the third common electrode layer 122_4d may be replaced with a transparent insulating layer 123 including silicon nitride ($SiN_x$).

Referring to FIGS. 13 and 16, when the sum of the thicknesses of the first common electrode layer 122_1d and the third common electrode layer 122_4d is 150 Å to 470 Å, the thickness of the metal layer 122_3d is 20 Å to 50 Å, and the thickness of the second common electrode layer 122_2d is 100 Å to 300 Å, the reflectance in the light transmitting area TA may be lower than the reference reflectance. That is, the sum of the thicknesses of the first common electrode layer 122_1d and the thickness of the third common electrode layer 122_4d according to the embodiment of FIG. 16 may be regarded as the thickness of the first common electrode layer 122_1d according to the embodiment of FIG. 10.

Hereinafter, because the arrangement, the refractive index and the thickness of the common electrode layer and the metal layer 122_3d and the reduction of external light reflection in the light transmitting area TA are substantially the same as or similar to those of FIGS. 10 to 14, a detailed description thereof will be omitted.

Similarly, because the arrangement, the refractive index and the thickness of the first common electrode layer 122_1d and the reduction of external light reflection in the light blocking area BA are substantially the same as or similar to those of FIGS. 5 to 7, a detailed description thereof will be omitted.

The third common electrode layer 122_4d may bond both layers in contact with one surface and the other surface. For example, the third common electrode layer 122_4d may bond the blocking member and the metal layer 122_3d or bond the first common electrode layer 122_1d and the third common electrode layer 122_4d. The third common electrode layer 122_4d may include an adhesive.

The third common electrode layer 122_4d may block the movement of materials between both layers adjacent to one surface and the other surface. For example, the third common electrode layer 122_4d may block the movement of materials between the light blocking member 124 and metal layer 122_3d or between the first common electrode layer 122_1d and third common electrode layer 122_4d.

The light blocking member 124 may be disposed between the first common electrode layer 122_1d and the third common electrode layer 122_4d. As described above, the light blocking member 124 may define the light blocking area BA and the light transmitting area TA.

The first common electrode layer 122_1d, the metal layer 122_3d, the second common electrode layer 122_2d, the third common electrode layer 122_4d, and the light blocking member 124 may be arranged differently depending on the light blocking area BA or the light transmitting area TA. For example, the second insulating substrate 121, the first common electrode layer 122_1d, the light blocking member 124, the third common electrode layer 122_4d, the metal layer 122_3d, and the second common electrode layer 122_2d may be sequentially arranged along one side direction of the light blocking area BA. Further, the second insulating substrate 121, the first common electrode layer 122_1d, the third common electrode layer 122_4d, the metal layer 122_3d, and the second common electrode layer 122_2d may be sequentially arranged along one side direction of the light transmitting area TA.

The light blocking member 124 may be surrounded by the common electrode 122d. For example, the other surface of the light blocking member 124 may be surrounded by the first common electrode layer 122_1d, and one surface and both side surfaces of the light blocking member 124 may be surrounded by the third common electrode layer 122_4d.

According to the display device and the manufacturing method thereof, an influence of an electric field between a sensing electrode and a lower panel can be reduced.

The effects of the present invention are not limited by the foregoing, and other various effects are anticipated herein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
   a first substrate including a pixel electrode provided for each pixel of a plurality of pixels; and
   a second substrate facing the first substrate and including an insulating substrate, a light blocking member disposed along a boundary of each pixel of the plurality of pixels, and a common electrode disposed along the plurality of pixels;
   wherein the common electrode includes a first common electrode layer and a second common electrode layer, the first common electrode layer and the second common electrode layer including a transparent conductive material,
   wherein the first common electrode layer is disposed on one surface of the insulating substrate,
   wherein the light blocking member is disposed on the first common electrode layer,
   wherein the second common electrode layer is disposed on the first common electrode layer and the light blocking member,
   wherein the light blocking member defines a light blocking area and a light transmitting area,
   wherein the second common electrode layer is in contact with the first common electrode layer in the light transmitting area, and
   wherein the second common electrode layer is spaced apart from the first common electrode layer in the light blocking area.

2. The display device of claim 1,
   wherein the light blocking member overlaps the first common electrode layer and the second common electrode layer in a thickness direction.

3. The display device of claim 1,
   wherein the second common electrode layer covers one surface and a side surface of the light blocking member.

4. The display device of claim 1,
   wherein the first common electrode layer has a thickness of 150 Å to 400 Å and a refractive index of 1.8 to 2.2.

5. The display device of claim 4,
   wherein the first common electrode layer is in contact with the one surface of the insulating substrate.

6. The display device of claim 4,
   wherein a refractive index of the light blocking member is greater than the refractive index of the first common electrode layer.

7. The display device of claim 6,
   wherein a thickness of the light blocking member is equal to 1.0 μm or greater than 1.0 μm.

8. The display device of claim 7,
   wherein a sum of the thickness of the first common electrode layer and a thickness of the second common electrode layer is 1100 Å to 1600 Å.

9. The display device of claim 4,
   wherein an absolute value of a difference between a refractive index of the second common electrode layer and the refractive index of the first common electrode layer is 0.05 or less than 0.05.

10. A display device, comprising:
    a first substrate including a pixel electrode provided for each pixel; and
    a second substrate facing the first substrate and including an insulating substrate, a light blocking member disposed along a boundary of each pixel of the plurality of pixels, and a common electrode disposed along the plurality of pixels;
    wherein the common electrode includes a first common electrode layer and a second common electrode layer, the first common electrode layer and the second common electrode layer including a transparent conductive material,
    wherein the first common electrode layer is disposed on one surface of the insulating substrate,
    wherein the light blocking member is disposed on the first common electrode layer,
    wherein the second common electrode layer is disposed on the first common electrode layer and the light blocking member, and
    wherein the common electrode further includes a metal layer disposed between the first common electrode layer and the second common electrode layer.

11. The display device of claim 10,
    wherein the metal layer covers one surface and a side surface of the light blocking member.

12. The display device of claim 10,
    wherein the metal layer has a thickness of 20 Å to 50 Å, and the second common electrode layer has a thickness of 100 Å to 300 Å.

13. The display device of claim 12,
    wherein the metal layer is composed of a three-component system including silver and copper.

14. The display device of claim 10,
    wherein the common electrode further includes a third common electrode layer disposed between the light blocking member and the metal layer, and
    wherein the third common electrode layer has a thickness of 30 Å to 70 Å.

15. A display device, comprising:
    a first substrate including a pixel electrode provided for each pixel of a plurality of pixels; and
    a second substrate facing the first substrate and including an insulating substrate, a light blocking member disposed along a boundary of each pixel of the plurality of pixels, a transparent insulating layer disposed along the plurality of pixels, and a common electrode disposed along the plurality of pixels and including a transparent conductive material; and
    a metal layer disposed between the common electrode and the transparent insulating layer,
    wherein the transparent insulating layer is disposed on one surface of the insulating substrate,
    wherein the light blocking member is disposed on the transparent insulating layer, and
    wherein the common electrode is disposed on the transparent insulating layer and the light blocking member.

16. The display device of claim 15,
wherein an absolute value of a difference between a refractive index of the transparent insulating layer and a refractive index of the common electrode is 0.05 or less than 0.05.
17. The display device of claim 15,
wherein the transparent insulating layer has a thickness of 150 Å to 400 Å and a refractive index of 1.8 to 2.2.
18. The display device of claim 15,
wherein the metal layer has a thickness of 20 Å to 50 Å, and the common electrode has a thickness of 100 Å to 300 Å.

* * * * *